United States Patent
Cho

(10) Patent No.: US 9,298,270 B2
(45) Date of Patent: Mar. 29, 2016

(54) WRITTEN CHARACTER INPUTTING DEVICE AND METHOD

(75) Inventor: Hyeon Joong Cho, Goyang-si (KR)

(73) Assignee: Korea University Research and Business Foundation, Seoul (KR)

( * ) Notice: Subject to any disclaimer, the term of this patent is extended or adjusted under 35 U.S.C. 154(b) by 677 days.

(21) Appl. No.: 13/577,202

(22) PCT Filed: Feb. 1, 2011

(86) PCT No.: PCT/KR2011/000697
§ 371 (c)(1),
(2), (4) Date: Sep. 11, 2012

(87) PCT Pub. No.: WO2011/096702
PCT Pub. Date: Aug. 11, 2011

(65) Prior Publication Data
US 2013/0033447 A1    Feb. 7, 2013

(30) Foreign Application Priority Data

Feb. 3, 2010  (KR) .................. 10-2010-0010100
Jun. 9, 2010  (KR) .................. 10-2010-0054209
Sep. 28, 2010 (KR) .................. 10-2010-0093887

(51) Int. Cl.
*G06F 3/01*    (2006.01)
*G06F 3/023*   (2006.01)
*G06F 3/0488*  (2013.01)
*H04M 1/23*    (2006.01)

(52) U.S. Cl.
CPC .............. *G06F 3/018* (2013.01); *G06F 3/0234* (2013.01); *G06F 3/0236* (2013.01); *G06F 3/04886* (2013.01); *G06F 2203/04802* (2013.01); *H04M 1/23* (2013.01)

(58) Field of Classification Search
None
See application file for complete search history.

(56) References Cited

U.S. PATENT DOCUMENTS

2008/0174561 A1*  7/2008  Kim .................. 345/173
2009/0189853 A1*  7/2009  Oh ................... 345/156
2010/0093400 A1*  4/2010  Ju et al. ............ 455/566

FOREIGN PATENT DOCUMENTS

| KR | 2005-0038441 A | 4/2005 |
| KR | 2006-0119527 A | 11/2006 |
| KR | 2009-0009184 A | 1/2009 |
| KR | 2009-0053419 A | 5/2009 |

* cited by examiner

Primary Examiner — Kenneth B Lee, Jr.
(74) Attorney, Agent, or Firm — McDermott Will & Emery LLP

(57) ABSTRACT

A character input apparatus comprises a display unit configured to display a graphic zone that displays multiple character groups including one or more characters and a touch zone that senses a touch of an input mean; a display control unit configured to select any one of the multiple character groups depending on a touch type of the input mean sensed by the touch zone and display the selected character at a predetermined position of the graphic zone; and an input unit configured to set the character displayed at the predetermined position of the graphic zone for a predetermined time as an input character. The display control unit selects a character moved to be closest to the predetermined position when the characters displayed on the graphic zone are moved in a sliding direction of the input mean and displays the selected character at the predetermined position of the graphic zone.

16 Claims, 23 Drawing Sheets

(E)　　　　　　　　　(F)

(A)

(B)

(C)

(D)

(E)

(F)

(G)

(H)

(I)

(J)

(K)

(L)

(M)

(N)

(O)

(P)

(Q)

(R)

(S)

(A)  (B)  (C)  (D)  (E)

(A)

(B)  (C)

(A)

(B)

(C)

(D)

(E)

(A)

(B)

(C)

(A)

(B)

(C)

(A)

(B)

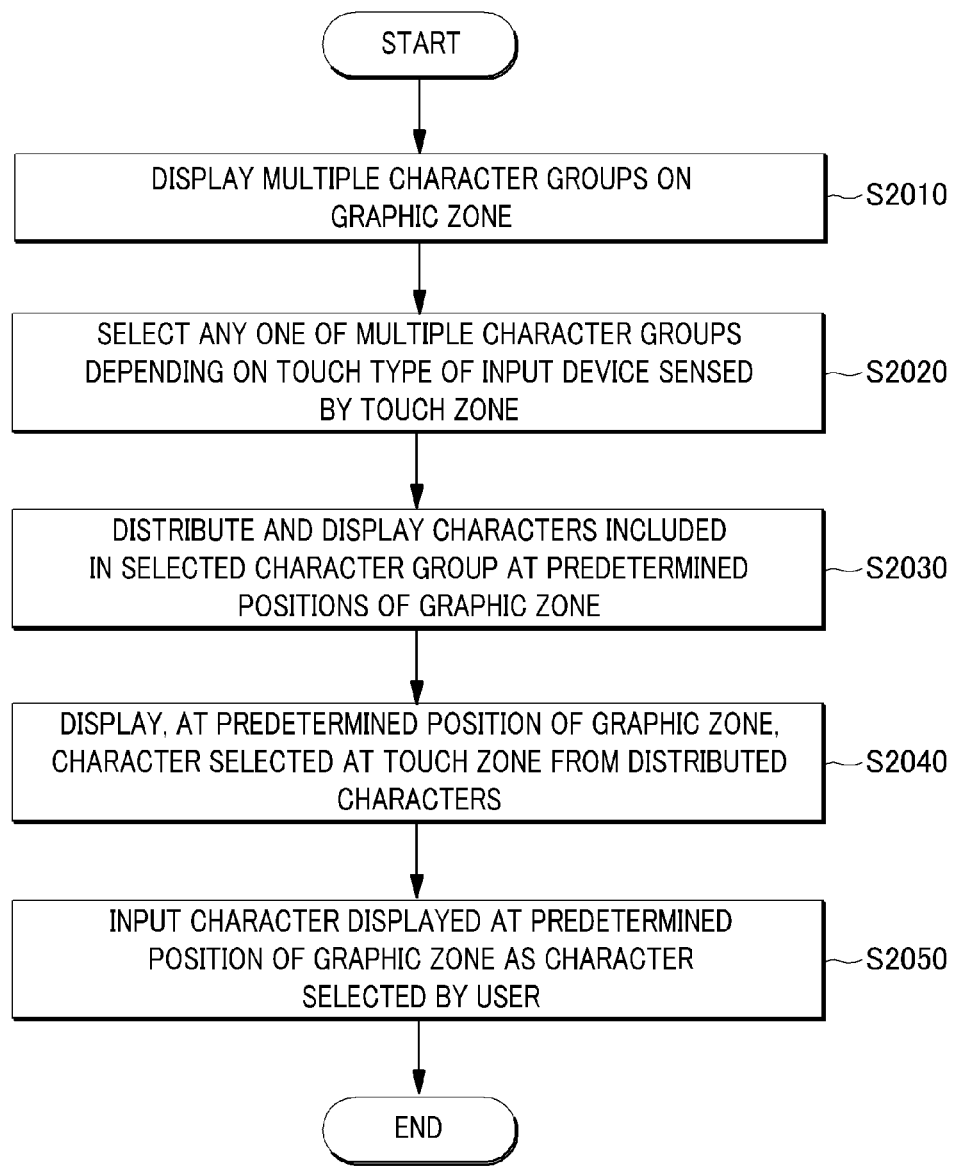

WRITTEN CHARACTER INPUTTING DEVICE AND METHOD

RELATED APPLICATIONS

This application is the U.S. National Phase under 35 U.S.C. §371 of International Application No. PCT/KR2011/000697, filed on Feb. 1, 2011, which in turn claims the benefit of Korean Patent Application Nos. 10-2010-0010100, filed on Feb. 3, 2010, 10-2010-0054209, filed on Jun. 9, 2010 and 10-2010-0093887, filed on Sep. 28, 2010, the disclosures of which Applications are incorporated by reference herein.

TECHNICAL FIELD

The present disclosure relates to an apparatus and method for inputting characters.

BACKGROUND ART

In recent times, with a smart phone or a PDA equipped with a touch screen, characters are input by directly touching a screen with a finger instead of using physical buttons. In particular, various techniques for sensing single or multiple finger touches and sensing a sliding of a finger have been gradually commercialized. Further, as various input interfaces are available, various methods for inputting characters have been suggested.

However, conventionally, when a user touches a small virtual button displayed on a small touch screen of a smart phone with his/her finger, the user often makes typographical errors. That is, most smart phones have 24 or more small virtual buttons arranged and displayed similarly to a keyboard layout called "QWERTY" used in a typical desktop PC. As for a capacitive screen equipped in a smart phone, characters are usually input by using a finger instead a touch pen, and, thus, it is somewhat inconvenient to input characters.

When a user selects a virtual button displayed on a touch screen, the virtual button is hidden by a finger of the user. That is, a character button is hidden from user's view by his/her finger, and, thus, immediacy of use can be decreased.

Therefore, it is necessary to improve a conventional character input method in which two-dimensional planar buttons are simply displayed in a virtual space.

DISCLOSURE OF THE INVENTION

Problems to be Solved by the Invention

An illustrative embodiment provides a character input apparatus and method that makes it possible to effectively input a character without hiding a character by an input mean while the character is input.

Further, an illustrative embodiment provides a character input apparatus and method that makes it possible to more emotionally and intuitively input a character by inputting a character selected depending on the number of touches at a touch zone and a sliding direction.

Means for Solving the Problems

In view of the foregoing, in accordance with a first aspect of the present disclosure, there is provided a character input apparatus including: a display unit configured to display a graphic zone that displays multiple character groups including one or more characters and a touch zone that senses a touch of an input mean; a display control unit configured to select any one of the multiple character groups depending on a touch type of the input mean sensed by the touch zone and display the selected character at a predetermined position of the graphic zone; and an input unit configured to set the character displayed at the predetermined position of the graphic zone for a predetermined time as an input character, wherein the display control unit selects a character moved to be closest to the predetermined position when the characters displayed on the graphic zone are moved in a sliding direction of the input mean and displays the selected character at the predetermined position of the graphic zone.

Further, in accordance with a second aspect of the present disclosure, there is provided a character input method using a character input apparatus, the character input method including: (a) displaying multiple character groups including one or more characters on a graphic zone; (b) selecting any one of the multiple character groups depending on a touch type of an input mean sensed by a touch zone; (c) arranging the selected character group at a predetermined position of the graphic zone; (d) distributing and displaying characters included in the selected character group on the graphic zone; (e) selecting any one of the characters displayed on the graphic zone depending on the touch type of the input mean at the touch zone; (f) arranging the character selected in the step (e) at the predetermined position of the graphic zone; and (g) when the character arranged in the step (f) is displayed at the predetermined position of the graphic zone for a predetermined time, setting the character as an input character, wherein in the steps (b) and (e), a character group or a character moved to be closest to the predetermined position when the character groups or characters displayed on the graphic zone are moved in a sliding direction of the input mean is selected.

Effect of the Invention

In accordance with any one of the above-described aspects of the present disclosure, a convention method in which a character input is recognized depending on a touch point can be improved and a character can be effectively input without hiding the character by an input mean while the character is input.

Further, in accordance with any one of the above-described aspects of the present disclosure, a character or any one of characters included in a character group is arranged at a predetermined position of a graphic zone depending on the number of touches and a sliding direction and the character displayed at the predetermined position of the graphic zone is input as a character selected by a user, so that the character can be input more emotionally and intuitively.

BRIEF DESCRIPTION OF THE DRAWINGS

FIG. 20 is a flow chart that shows a character input method using a character input apparatus in accordance with an illustrative embodiment.

BEST MODE FOR CARRYING OUT THE INVENTION

Figure 1:
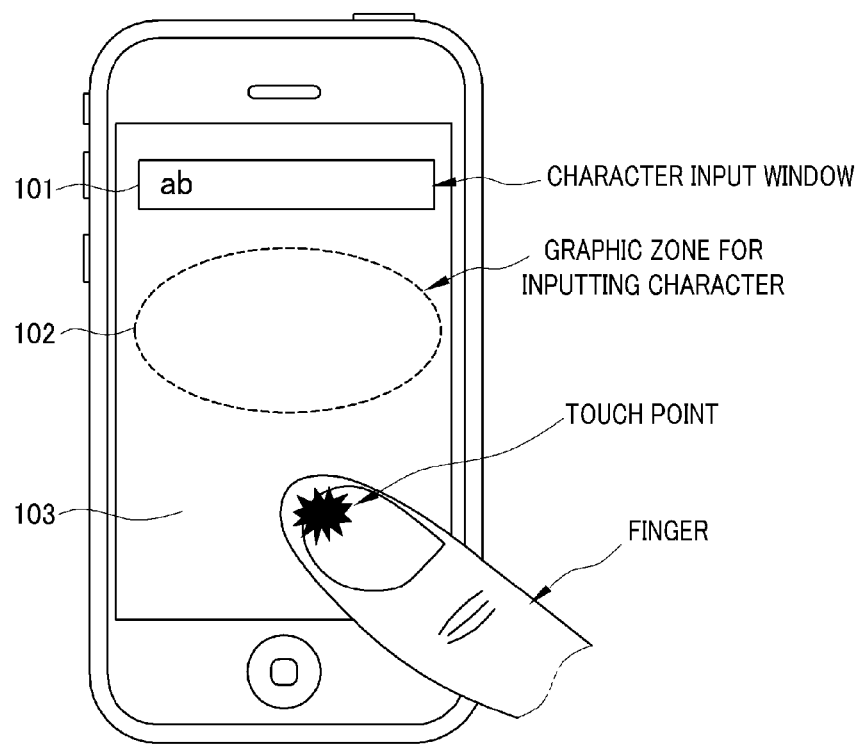
FIG. 1 illustrates a touch screen of a telecommunication terminal for inputting characters in accordance with an illustrative embodiment.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 illustrates a touch screen of a telecommunication terminal for inputting characters in accordance with an illustrative embodiment.

A screen of a character input apparatus 100 includes a display zone 101 for displaying an input character, a graphic zone 102 for displaying a character or a character group including one or more characters, and a touch zone 103 for sensing a touch of an input mean.

Herein, if a user selects a character at the touch zone 103 while looking at characters displayed on the graphic zone 102, the selected character is displayed on the display zone 101. Conventionally, if a button displayed on a touch screen is touched, such a character button is hidden by a finger for selecting the character, and, thus, immediacy of use is decreased.

However, in accordance with the present disclosure, the touch zone 103 and the graphic zone 102 are separated from each other. Thus, a user can input a character without hiding the character by his/her finger while continuously looking at input characters. Accordingly, the user can input characters more intuitively and conveniently.

The user can input characters without directly touching virtual characters displayed on the graphic zone 102. A typical terminal displays all characters on a limited screen, and, thus, a size of each character is small and it is inconvenient for the user to correctly select the character. However, in accordance with the present disclosure, a character displayed on the graphic zone 102 can be selected correctly just by adequately touching the touch zone 103, and, thus, user convenience can be increased.

Herein, the graphic zone 102 and the touch zone 103 are separated from each other on an output screen of the character input apparatus 100, but the graphic zone 102 may be included in the touch zone 103 in practice. That is, the touch zone 103 may be extended to the graphic zone 102 and a character can be selected by a touch at the graphic zone 102.

Further, the user can select a character to be input with various input means (for example, his/her finger, a touch pen, etc.).

Hereinafter, there will be explained a case where a character is input by a finger touch. A character can be simply selected and input depending on a touch type of the user, i.e. the number of touches (single touch or multiple touches) and a sliding direction.

Herein, a single touch includes touching the touch zone 103 with a single finger one time. Further, multiple touches including touching the touch zone 103 with a single finger two or more times or touching the touch zone 103 with two fingers at once. Hereinafter, such a case will be explained in detail with reference to an example of Korean input.

Figure 2:
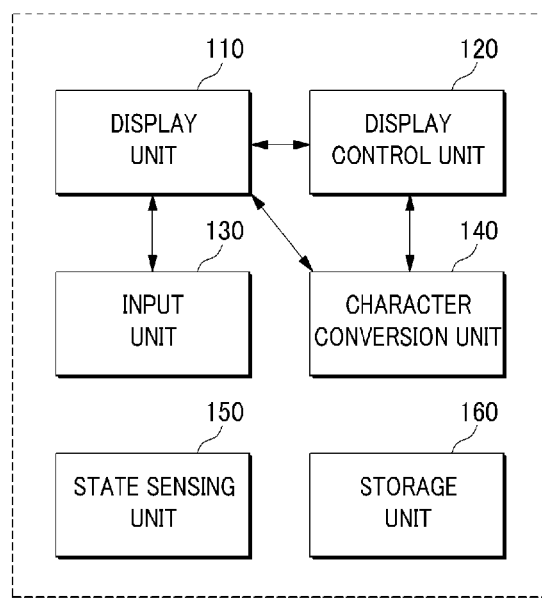
FIG. 2 is a block diagram of a character input apparatus in accordance with an illustrative embodiment.

FIG. 2 is a block diagram of a character input apparatus in accordance with an illustrative embodiment.

The character input apparatus 100 includes a display unit 110, a display control unit 120, an input unit 130, a character conversion unit 140, a state sensing unit 150, and a storage unit 160.

The character input apparatus 100 may be configured as various user terminals and allows various application processes using input characters selected by a user to be performed in a user terminal. By way of example, if the character input apparatus 100 is configured as a mobile phone, a telephone number or a short message can be input with input characters selected through the character input apparatus 100.

Further, the character input apparatus 100 may be equipped in a mobile communication terminal. By way of example, the mobile communication terminal is a wireless communication apparatus with portability and mobility and includes any type of handheld wireless communication apparatuses such as a smart phone, a PCS (Personal Communication System), a GSM (Global System for Mobile communications), a PDC (Personal Digital Cellular), a PHS (Personal Handyphone System), a PDA (Personal Digital Assistant), an IMT (International Mobile Telecommunication)-2000 terminal, a CDMA (Code Division Multiple Access)-2000 terminal, a W-CDMA (W-Code Division Multiple Access) terminal, and a Wibro (Wireless Broadband Internet) terminal.

The display unit 110 includes the touch zone 103 for sensing a touch of an input mean and the graphic zone 102 for displaying a character or a character group including one or more characters. Herein, in order for a character not to be hidden by an input mean while the character is input, a character displayed on the graphic zone 102 is selected regardless of a touch at the graphic zone 102.

Further, the display unit 110 includes the display zone for displaying an input character input by the input unit 130 to be described later. Herein, the display unit 110 may divide characters into multiple character groups according to any one of a keyboard layout order, a writing order, pronunciation, and a kind of a character and display them on the graphic zone 102.

The character may include at least one of alphabetic characters, Korean consonants, Korean vowels, numbers, and marks. By way of example, the display unit 110 may divide alphabetic characters into respective character groups according to an alphabetical order (i.e. a to z) and display them on the graphic zone 102. Further, the display unit 110 may divide Korean characters into respective character groups according to a Korean alphabetical order and display them on the graphic zone 102. Furthermore, the display unit 110 may divide vowels into respective character groups according to a kind of a vowel, for example, a monophthong and a diphthong, and display them on the graphic zone 102. Moreover, if the user uses both hands to input Korean characters, the display unit 110 may receive, as data, a consonant input by pressing a button with a left thumb and a vowel input by touching a right thumb to the touch zone 103 and display the data on the display zone 101. In this way, a conventional button method and a touch method of the present disclosure can be used together. Further, during Korean input, if any one of vowels is arranged at a central area of the graphic zone 102 according to a sliding direction on the touch zone 103 and a finger keeps touching the touch zone 103 for a critical time, the display unit 110 may further display, at a certain position on the graphic zone 102, vowels having one or more strokes added to the vowel arranged at the central area. Details thereof will be explained later.

The display control unit 120 selects a character group or a character depending on a touch type of an input mean, i.e. the number of touches and a sliding direction, sensed by the touch zone 103 and displays it at a preset position on the graphic zone 102.

By way of example, if a character group is arranged at the central area of the graphic zone 102 according to a sliding direction on the touch zone 103, the display control unit 120 may distribute characters included in the character group to preset positions on the graphic zone 102.

Herein, the number of touches includes a single touch including touching the touch zone 103 with a single finger one time and multiple touches including touching the touch zone 103 with a single finger two or more times or touching the touch zone 103 with two fingers at once.

Further, the display control unit 120 may display, at the central area of the graphic zone 102, a character or a character group selected from characters arranged at preset positions depending on a touch type. Otherwise, display control unit 120 may display, at the central area of the graphic zone 102, a character selected depending on a sliding touch of the user.

Furthermore, the display control unit 120 may display multiple character groups on the graphic zone 102 as surrounding the central area of the graphic zone 102. The display control unit 120 may display, at the central area of the graphic zone 102, a character group selected from character groups surrounding the central area of the graphic zone 102 depending on a touch type of an input mean sensed by the touch zone 103.

The input unit 130 sets a character displayed at a preset position on the graphic zone 102 as an input character. By way of example, the input unit 130 may set a character displayed at the central area of the graphic zone 102 as an input character and transmit it to the display unit 110. In this case, after a single touch or multiple touches, if an input mean is detached or a critical time elapses without a sliding operation, the input unit 130 may input the character displayed at the center area of the graphic zone 102. Further, the input unit 130 may combine characters arranged at the central area of the graphic zone 102 for a critical time by consecutive sliding operations and input them.

The character conversion unit 140 converts a character displayed on the graphic zone 102 into a different kind of character in response to a character conversion signal and displays the converted character. By way of example, the character conversion unit 140 may convert an English input screen into a Korean input screen with a character conversion button.

After a single touch or multiple touches on the touch zone 103, if there is no additional sliding operation or an input mean is detached or a critical time elapses after an additional sliding operation, the state sensing unit 150 returns a character or a character group on the graphic zone 102 to its initial state.

The storage unit 160 stores respective characters, an algorithm for inputting characters or a graphic program.

A character selection and input method depending on a touch type of the present disclosure will be explained in detail with reference to the accompanying drawings.

Figure 3:
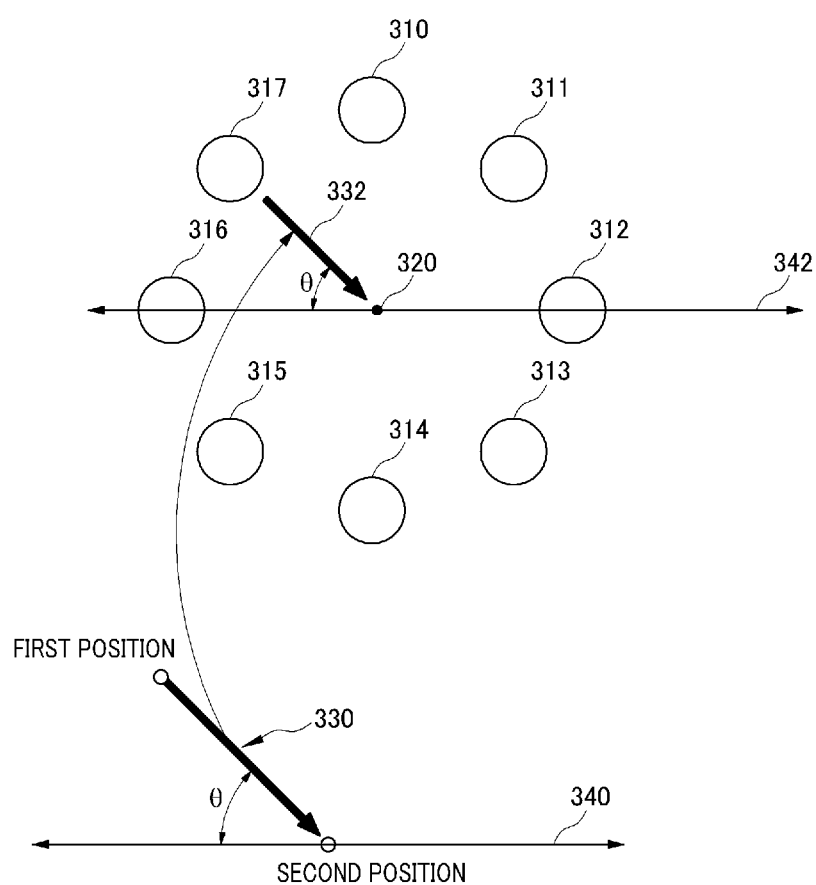
FIG. 3 is provided to explain a character selection method in accordance with an illustrative embodiment.

FIG. 3 is provided to explain a character selection method in accordance with an illustrative embodiment.

The character input apparatus 100 distributes and displays multiple character groups 310 to 317 on the graphic zone 102. In this case, a target position 320 may be set in advance on the graphic zone 102.

If the user slides an input mean from a first position to a second position on the touch zone 103, the display control unit 120 generates a vector 330 that indicates a sliding direction. In this case, a starting point of the vector 330 coincides with the first position and an ending point of the vector 330 coincides with the second position. The display control unit 120 maps the ending point of the vector 330 onto the target position 320 and determines a character group closest to the starting point of the vector 330 in that state as a character group selected by the user. In this case, the display control unit 120 may use virtual horizontal lines for mapping the vector 330. That is, the display control unit 120 performs mapping such that an angle formed between the vector 330 and a virtual horizontal line 340 is equal to an angle formed between a mapped vector 332 and a virtual horizontal line 342.

With this configuration, it is possible to automatically select any one character from multiple characters or any one character group from multiple character groups just by a touch of the user and particularly, a sliding direction.

Figure 4:
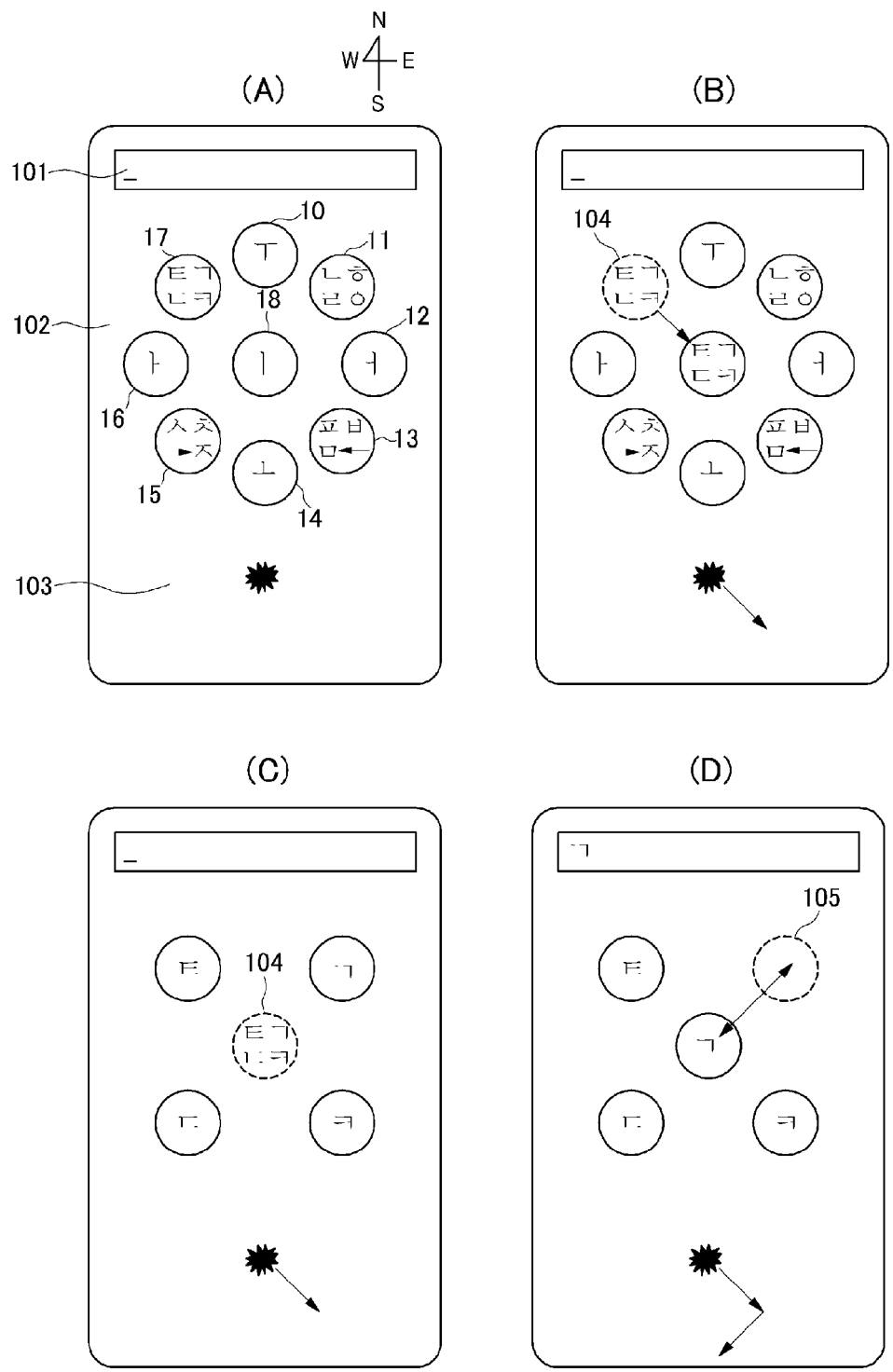
FIG. 4 illustrates a Korean input method in accordance with an illustrative embodiment.

FIG. 4 illustrates a Korean input method in accordance with an illustrative embodiment.

As depicted in FIG. 4(A), multiple character groups each including one or more Korean characters are displayed on the graphic zone 102. By way of example, a character group 10 includes vowels based on "ㅜ", a character group 11 includes consonants based on "ㄴ", "ㄹ", "ㅎ", and "ㅇ", a character group 12 includes vowels based on "ㅓ", a character group 13 includes consonants based on "ㅁ", "ㅂ", and "ㅍ", a character group 14 includes vowels based on "ㅗ", a character group 15 includes consonants based on "ㅅ", "ㅈ", and "ㅊ", a character group 16 includes vowels based on "ㅏ", and a character group 17 includes consonants based on "ㄱ", "ㄷ", "ㅋ", and "ㅌ".

Although FIG. 4(A) illustrates multiple character groups including consonants and multiple character groups including vowels, the present disclosure is not limited thereto and can be modified and changed in various ways in accordance with an illustrative embodiment.

Korean consonants can be divided into the respective character groups 10 to 17 in various ways depending on, for example, a Korean keyboard layout, a Korean layout order, pronunciation of a character, and other preset rules.

The multiple character groups are arranged in a circle around the center of the graphic zone 102. A certain character group is moved to a target position on the graphic zone 102 depending on a touch type of the user. By way of example, if the user touches a first position of the touch zone 103 with an input mean and slides the input mean from the first position to a second position, a character group to be arranged at the central area of the graphic zone 102 when it slides in such a sliding direction is automatically selected. Then, the selected character group is displayed at the target position on the graphic zone 102 along the sliding direction.

By way of example, as depicted in FIGS. 4(A) and 4(B), if the user touches a position of the touch zone 103 with an input mean and slides the input mean from a 10 to 11 o'clock direction to a 4 to 5 o'clock direction, a character group 104 to be arranged at the central area of the graphic zone 102 when it is moved in such a sliding direction is automatically selected. Then, the selected character group 104 is displayed at the central area of the graphic zone 102.

If the character group 104 including "ㄱ" is arranged at the central area of the graphic zone 102, as depicted in FIG. 4(C), characters belonging to the character group 104 including "ㄱ" are distributed and displayed at respectively preset positions.

In the character groups 11, 13, 15, and 17 each including multiple characters, positions to which characters are distributed may be displayed in advance before the characters are displayed. That is, as depicted in FIG. 4(C), if each character is arranged at each vertex of a virtual square, such character display positions are displayed in advance as depicted in FIG. 4(A) before the character group is selected in order to guide the user to easily select a character.

Then, as depicted in FIG. 4(D), the user may slide the input mean touching the touch zone 103 in a certain direction and select "ㄱ". That is, as explained with reference to FIG. 4(B), if the input mean slides from a 1 to 2 o'clock direction to a 7 to 8 o'clock direction, a character group 105 to be arranged at the central area of the graphic zone 102 when it is moved in such a sliding direction is automatically selected. Then, the display control unit 120 displays the selected character group 105 at the central area of the graphic zone 102.

The above-described Korean consonant input method follows the rules listed in Table 1.

TABLE 1

| Consonant | Number of touch | Sliding direction |
| --- | --- | --- |
| ㄱ | Single | ON, ES, WS, OFF |
| ㄴ | Single | ON, WS, ES OFF |
| ㄷ | Single | ON, ES, EN, OFF |
| ㄹ | Single | ON, WS, EN, OFF |
| ㅁ | Single | ON, WN, EN, OFF |

TABLE 1-continued

| Consonant | Number of touch | Sliding direction |
| --- | --- | --- |
| ㅂ | Single | ON, WN, WS, OFF |
| ㅅ | Single | ON, EN, ES OFF |
| ㅇ | Single | ON, WS, WN, OFF |
| ㅈ | Single | ON, EN, WN, OFF |
| ㅊ | Single | ON, EN, WS, OFF |
| ㅋ | Single | ON, ES, WN, OFF |
| ㅌ | Single | ON, ES, ES, OFF |
| ㅍ | Single | ON, WN, ES, OFF |
| ㅎ | Single | ON, WS, WS, OFF |

As described above, in accordance with the present disclosure, multiple character groups are distributed and displayed on the graphic zone 102 and a certain character group is automatically selected depending on a sliding direction of a user. In this case, for convenience, left to right-downward/right to left-downward diagonal directions are informally denoted as "ES" and "WS", respectively and left to right-upward/right to left-upward diagonal directions are informally denoted as "EN" and "WN", respectively.

Figure 5A:
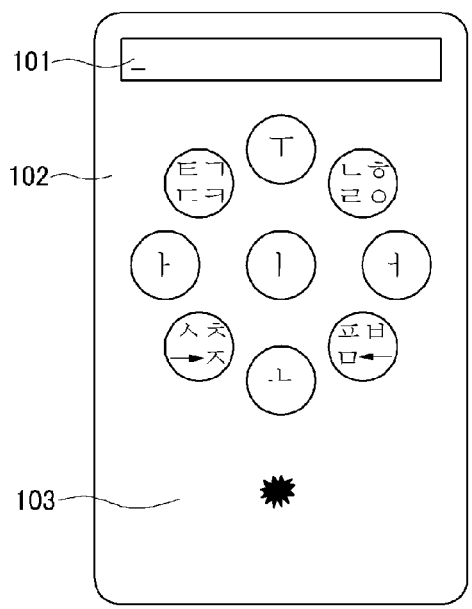
FIGS. 5A and 5B illustrate a Korean input method in accordance with an illustrative embodiment.
Figure 5A:
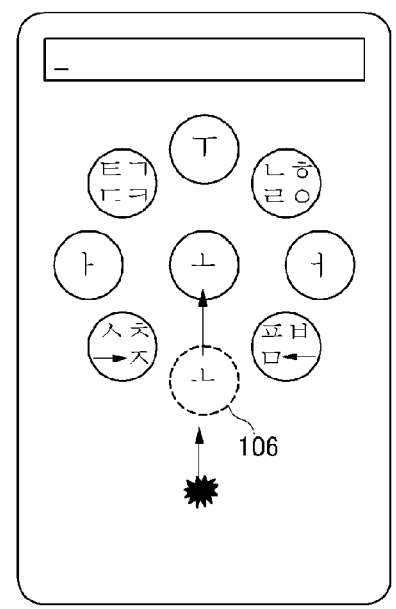
Figure 5A:
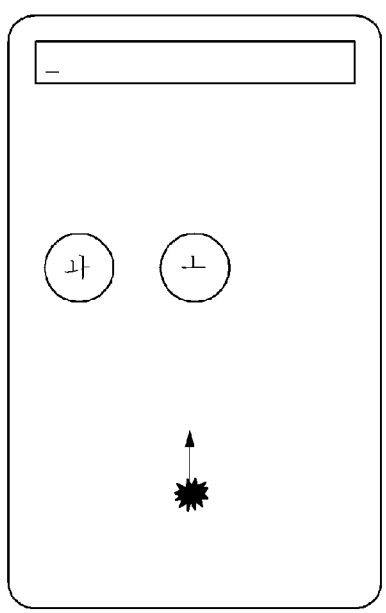
Figure 5A:
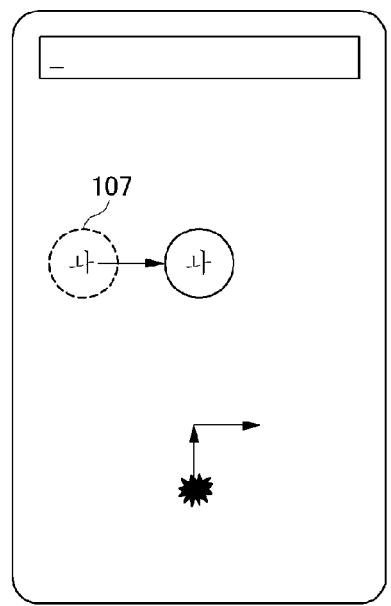
Figure 5B:
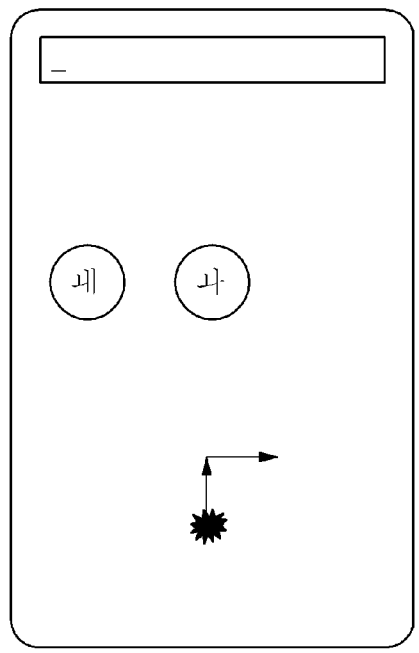
Figure 5B:
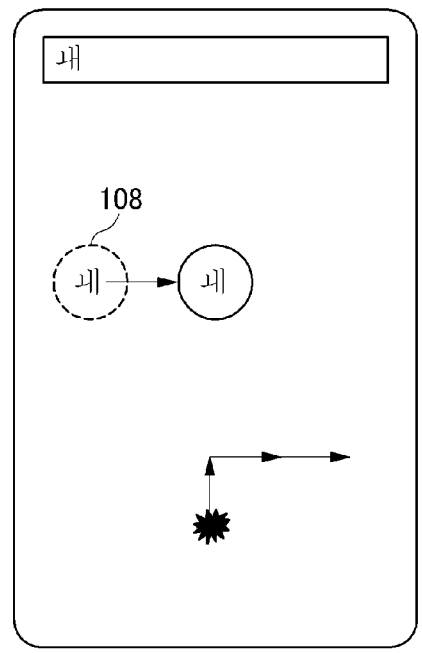

FIGS. 5a and 5b illustrate a Korean input method in accordance with an illustrative embodiment In FIGS. 5a and 5b, a method of inputting a diphthong "ㅙ" is illustrated. Vowels can be divided into monophthongs ("ㅣ", "ㅡ", "ㅗ", "ㅜ", "ㅏ", "ㅓ", "ㅐ", and "ㅔ") and diphthongs ("ㅛ", "ㅠ", "ㅑ", "ㅕ", "ㅒ", "ㅖ", "ㅘ", "ㅙ", "ㅝ", "ㅞ", "ㅢ", "ㅚ", and "ㅟ").

Herein, as depicted in FIG. 5a(A), a base vowel "ㅣ" is displayed at the central area of the graphic zone 102 and monophthongs "ㅗ", "ㅜ", "ㅏ", and "ㅓ" may be arranged so as to surround the central area of the graphic zone 102.

Then, as depicted in FIG. 5a(B), if the user touches a position of the touch zone 103 with an input mean and slides the input mean from a 6 o'clock direction to a 12 o'clock direction, a character group 106 to be arranged at the central area of the graphic zone 102 when it is moved in such a sliding direction is automatically selected. Thereafter, the display control unit 120 displays the selected character group 106 at the central area of the graphic zone 102.

Subsequently, if the character group 106 including "ㅗ" is arranged at the central area of the graphic zone 102, as depicted in FIG. 5a(C), characters belonging to the character group 106 including "ㅗ" are distributed and displayed at respectively preset positions. In this case, the character group 106 includes vowels "ㅗ" and "ㅘ" having one or more strokes added to the vowel "ㅗ" as a base vowel. The character group 106 may further include at least one of "ㅗ", "ㅘ", "ㅙ", and "ㅚ".

Then, as depicted in FIG. 5a(D), the user slides the input mean touching the touch zone 103 from a 9 o'clock direction to a 3 o'clock direction to arrange "ㅚ" at the central area of the graphic zone 102 and detaches the input mean to input "ㅚ" to the display zone 101.

After "ㅚ" is arranged at the central area of the graphic zone 102, if the input mean is not detached within a preset critical time, a character group 107 including a base vowel "ㅚ" is additionally displayed on the graphic zone 102. By way of example, the character group 107 may further include a vowel "ㅙ" having one or more strokes added to the vowel "ㅘ" as a base vowel. That is, as depicted in FIG. 5b(E), "ㅙ" having one or more strokes added to the vowel "ㅘ" as a base vowel may be displayed on the graphic zone 102 as a vowel which can be input. In this case, the user slides the input mean from a 9 o'clock direction to a 3 o'clock direction on the touch zone 103 to arrange "ㅙ" at the central area of the graphic zone 102 and detaches the input mean to input "ㅙ" to the display zone 101.

Figure 6:
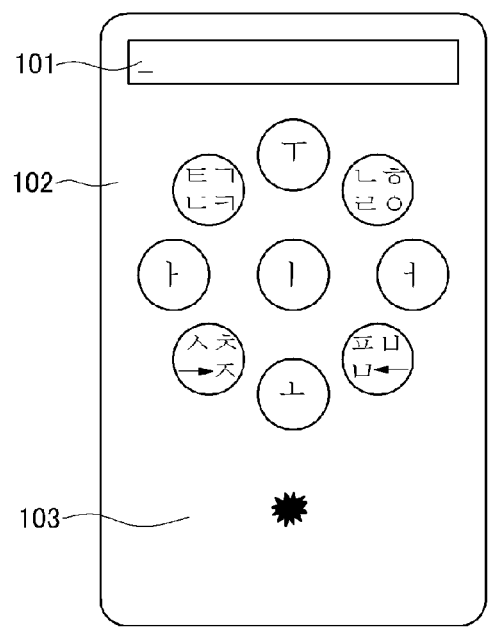
FIG. 6 illustrates a Korean input method in accordance with an illustrative embodiment.
Figure 6:
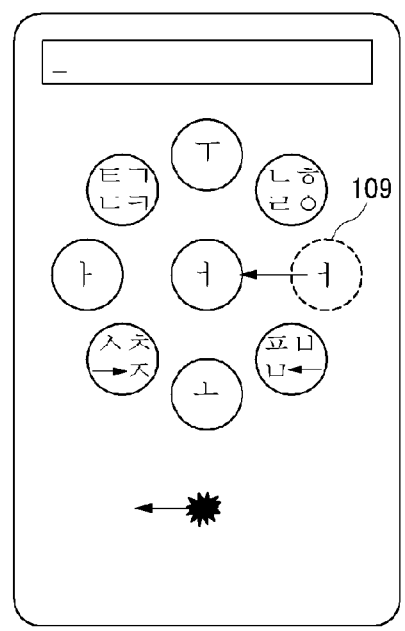
Figure 6:
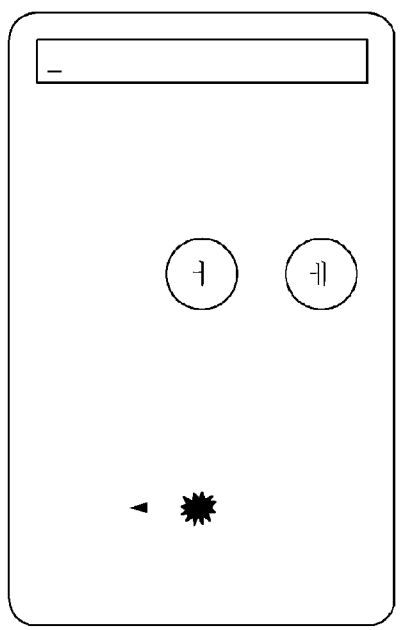
Figure 6:
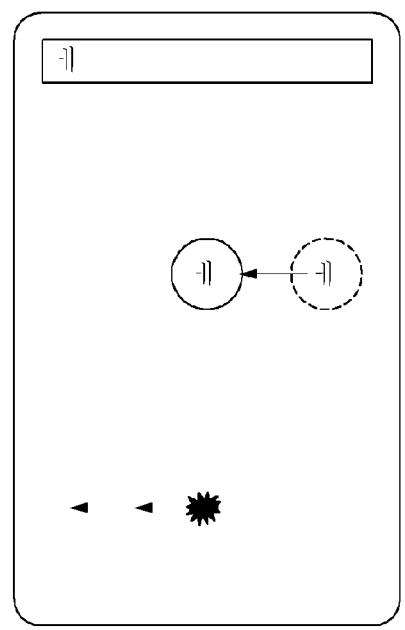

FIG. 6 illustrates a Korean input method in accordance with an illustrative embodiment.

In FIG. 6, a method of inputting a monophthong "ㅖ" is illustrated.

By way of example, as depicted in FIG. 6(A), "ㅣ" is displayed as a base vowel at the central area of the graphic zone 102 and monophthongs "ㅗ", "ㅜ", "ㅏ", and "ㅓ" may be arranged so as to surround the central area of the graphic zone 102. In this case, if the user makes a single touch and a critical time elapses without a sliding operation, the base vowel "ㅣ" is set as an input character.

Then, as depicted in FIG. 6(B), if the user touches a position of the touch zone 103 with an input mean and slides the input mean from a 3 o'clock direction to a 9 o'clock direction, a character group 109 to be arranged at the central area of the graphic zone 102 when it is moved in such a sliding direction is automatically selected. Thereafter, the display control unit 120 displays the selected character group 109 at the central area of the graphic zone 102.

Subsequently, if the character group 109 including "ㅓ" is arranged at the central area of the graphic zone 102, as depicted in FIG. 6(C), characters belonging to the character group 109 including "ㅓ" are distributed and displayed at respectively preset positions. In this case, the character group 109 includes vowels "ㅖ" having one or more strokes added to the vowel "ㅓ" as a base vowel.

Thereafter, as depicted in FIG. 6(D), the user slides the input mean touching the touch zone 103 from a 3 o'clock direction to a 9 o'clock direction to arrange "ㅖ" at the central area of the graphic zone 102 and detaches the input mean to input "ㅖ" to the display zone 101.

Figure 7:
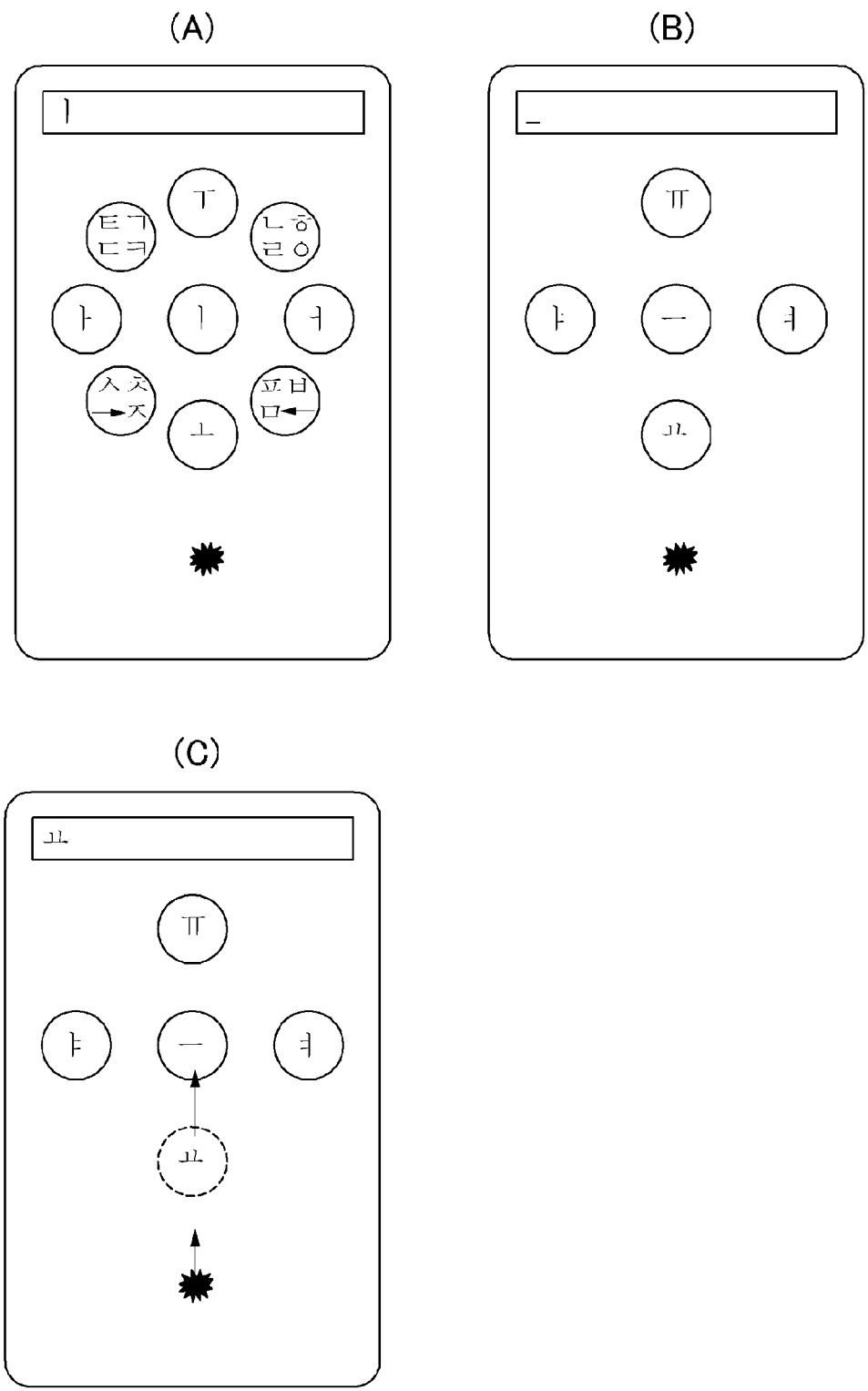
FIG. 7 illustrates a Korean input method in accordance with an illustrative embodiment.
Figure 8A:
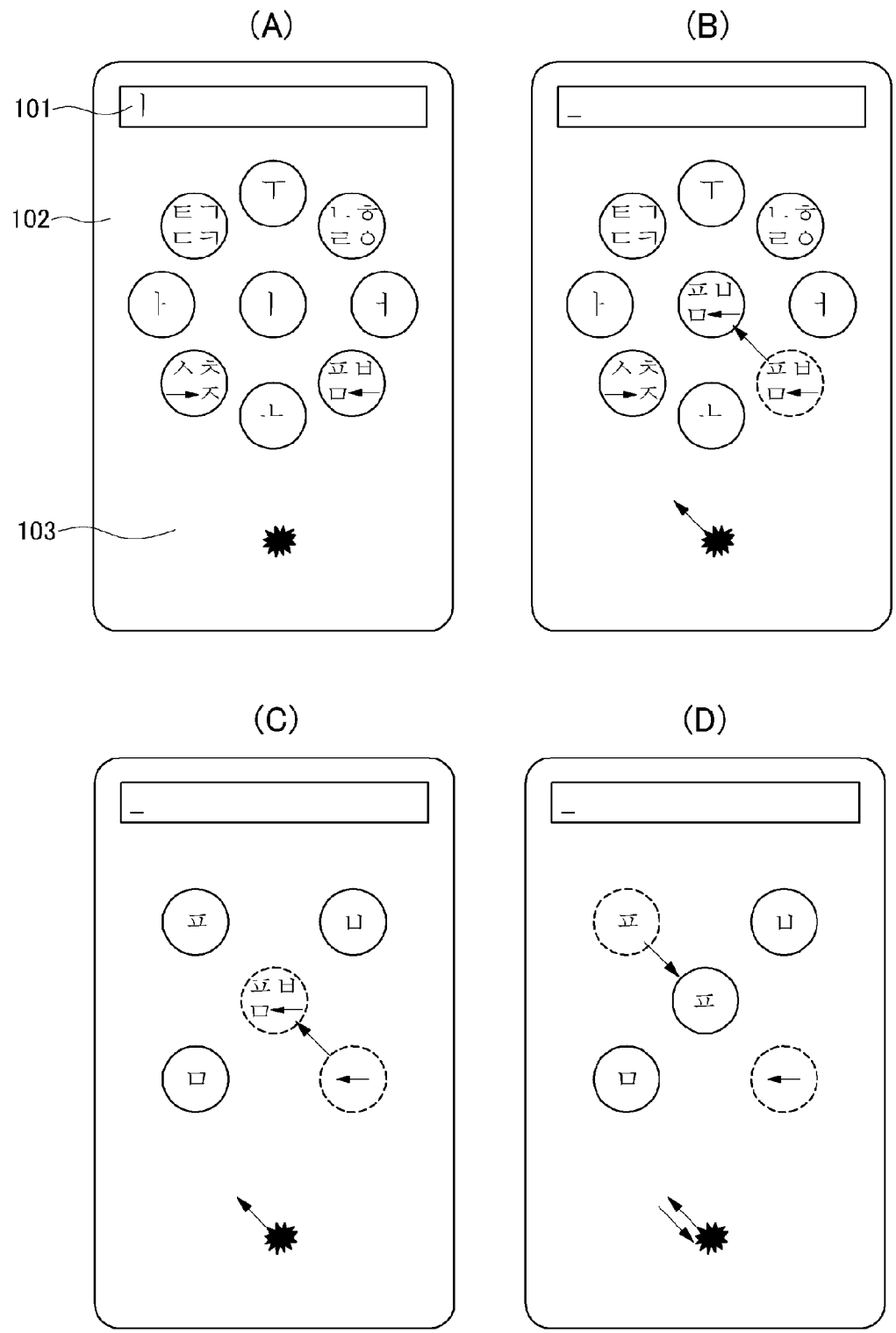
FIGS. 8A to 8E illustrate a Korean input method in accordance with an illustrative embodiment.
Figure 8B:
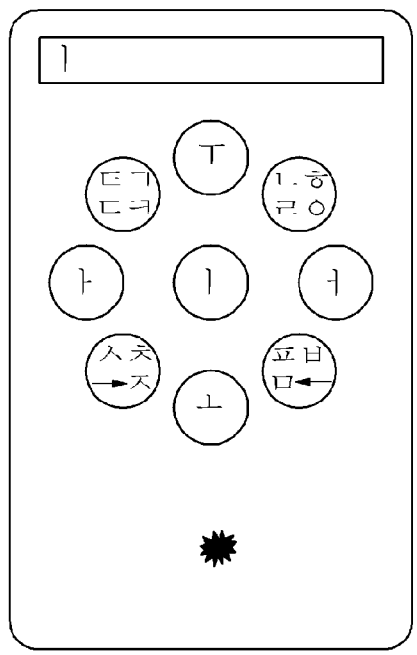
Figure 8B:
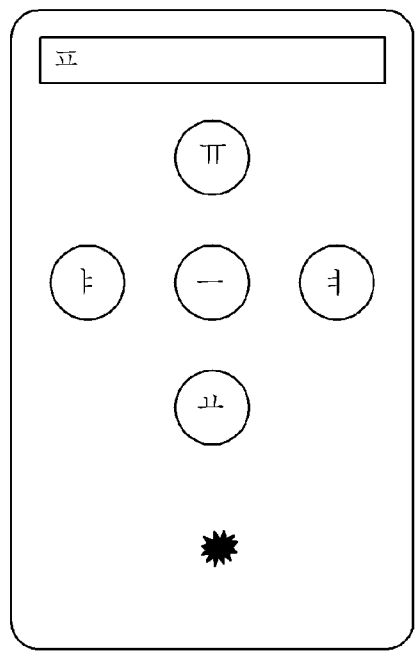
Figure 8B:
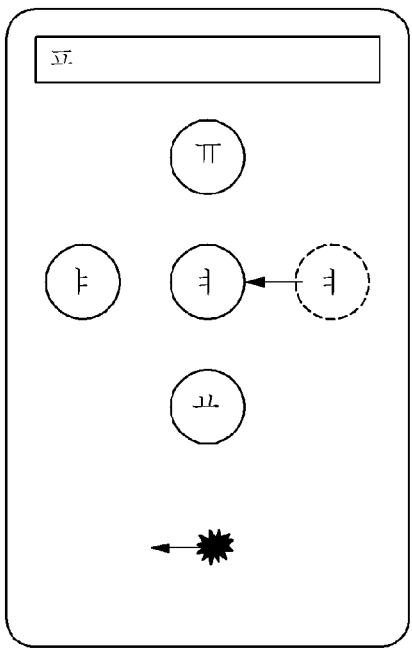
Figure 8B:
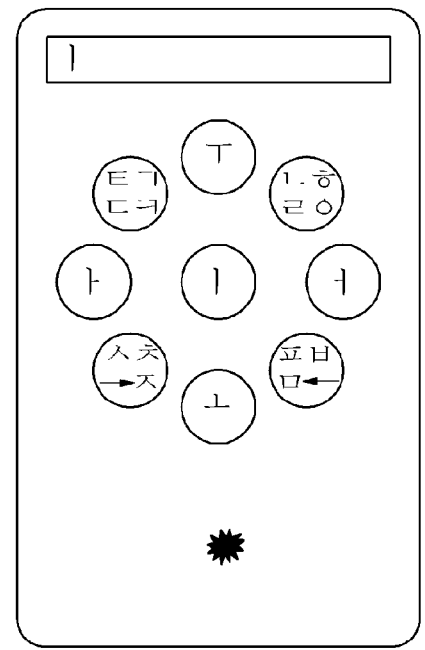
Figure 8C:
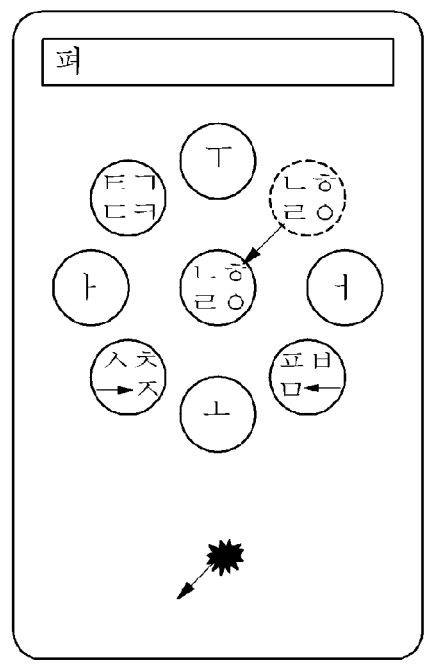
Figure 8C:
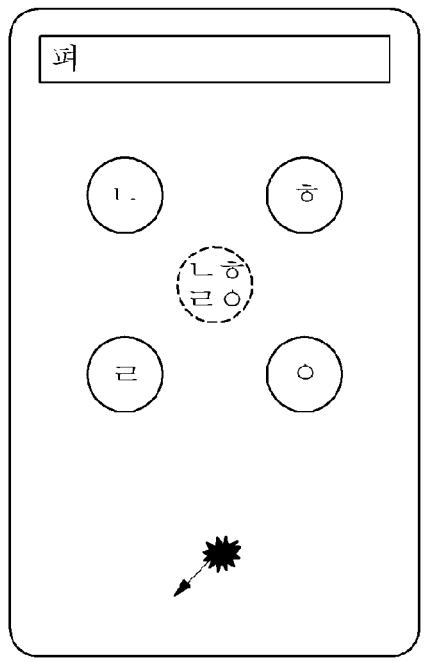
Figure 8C:
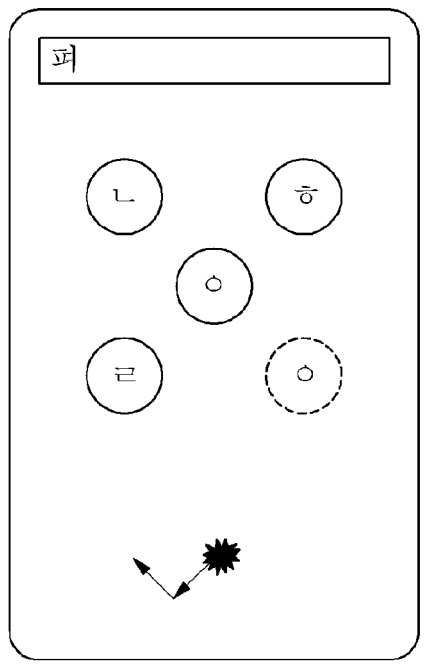
Figure 8C:
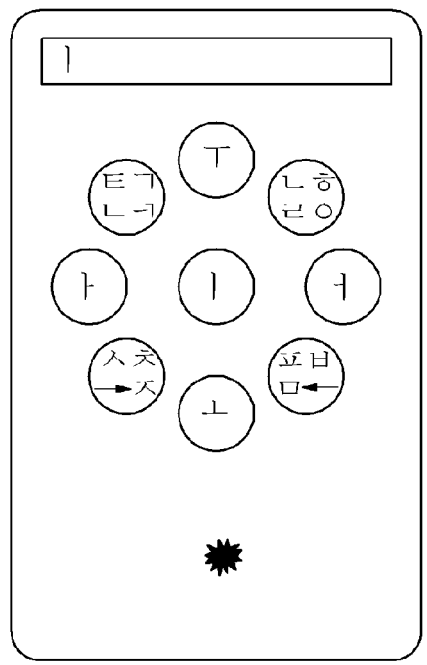
Figure 8D:
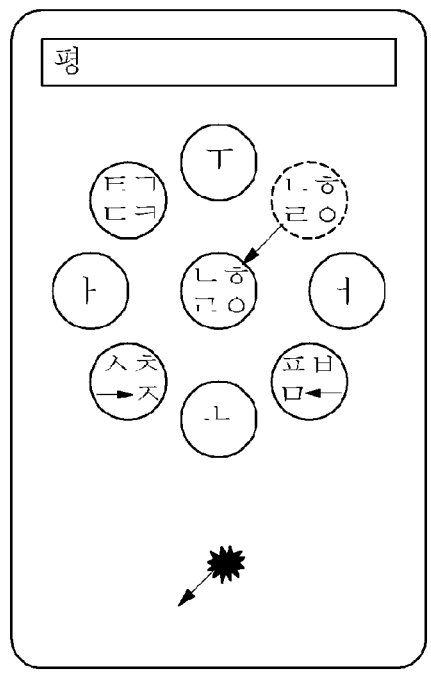
Figure 8D:
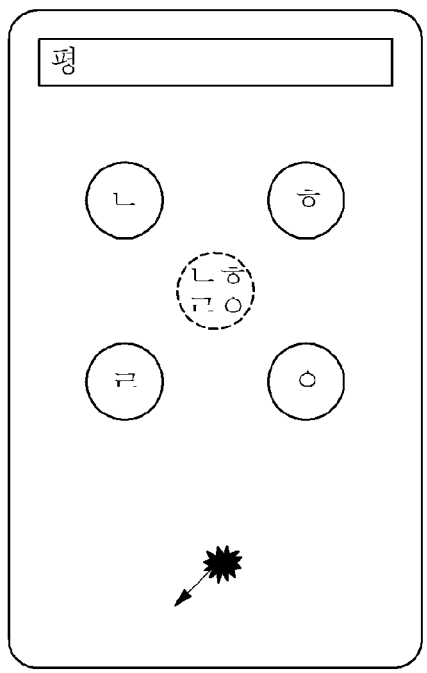
Figure 8D:
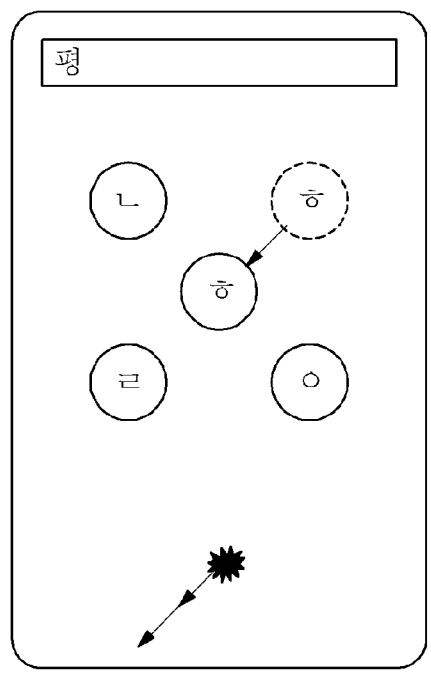
Figure 8D:
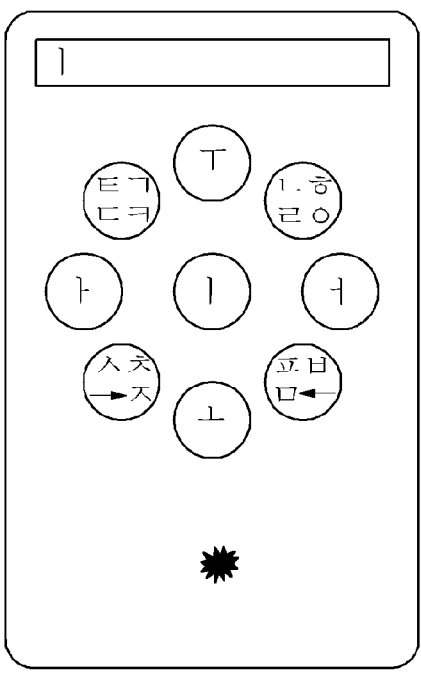
Figure 8E:
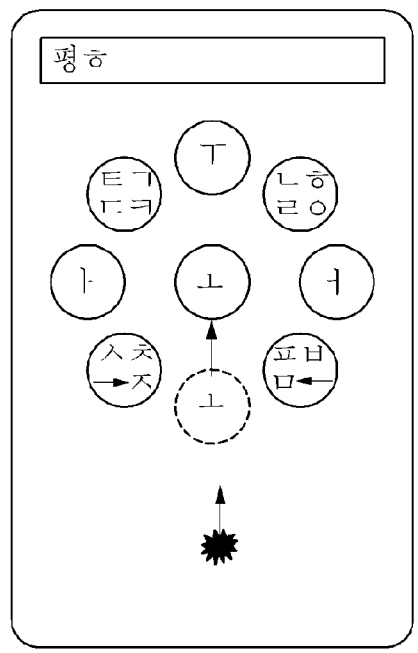
Figure 8E:
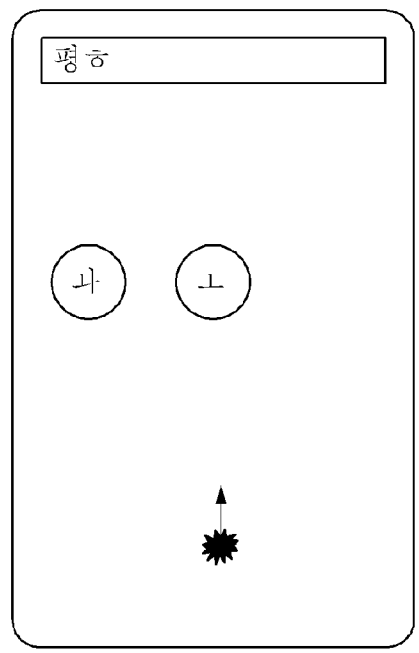
Figure 8E:
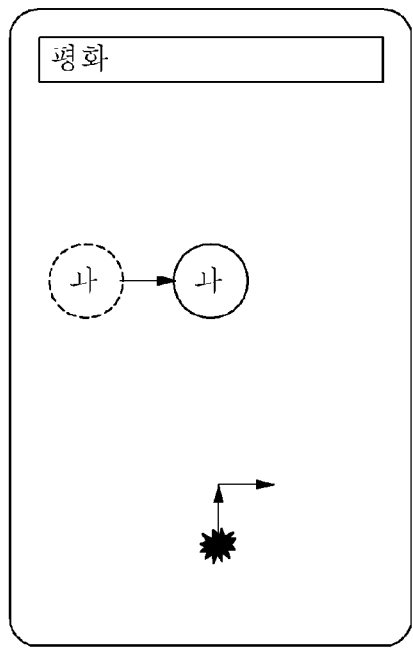

FIG. 7 illustrates a Korean input method in accordance with an illustrative embodiment.

In FIG. 7, a method of inputting a diphthong "ㅛ" is illustrated.

By way of example, as depicted in FIG. 7(A), "ㅣ" is displayed as a base vowel at the central area of the graphic zone 102 and monophthongs "ㅗ", "ㅜ", "ㅏ", and "ㅓ" may be arranged so as to surround the central area of the graphic zone 102.

Then, as depicted in FIG. 7(B), if the user touches a position of the touch zone 103 multiple times, is "-" is displayed at the central area of the graphic zone 102 and diphthongs "ㅛ", "ㅠ", "ㅑ", and "ㅕ" may be arranged so as to surround the central area of the graphic zone 102. In this case, if the user makes multiple touches and a critical time elapses without a sliding operation, the base vowel "-" is set as an input character.

Thereafter, as depicted in FIG. 7(C), if the user makes multiple times and slides an input mean from a 6 o'clock direction to a 12 o'clock direction, a character "ㅛ" to be arranged at the central area of the graphic zone 102 when a character group is moved in such a sliding direction is automatically selected. Then, the display control unit 120 displays the selected character at the central area of the graphic zone 102.

The above-described Korean vowel input method follows the rules listed in Table 2.

TABLE 2

| Vowel | Number of touch | Sliding direction |
|---|---|---|
| ㅏ | Single | ON, R, OFF |
| ㅓ | Single | ON, L, OFF |
| ㅗ | Single | ON, U, OFF |
| ㅜ | Single | ON, D, OFF |
| ㅐ | Single | ON, R, R, OFF |
| ㅔ | Single | ON, L, L, OFF |
| ㅑ | Multiple | ON, R, OFF |
| ㅕ | Multiple | ON, L, OFF |
| ㅒ | Multiple | ON, R, R, OFF |
| ㅖ | Multiple | ON, L, L, OFF |
| ㅛ | Multiple | ON, U, OFF |
| ㅠ | Multiple | ON, D, OFF |
| ㅘ | Single | ON, U, R, OFF |
| ㅝ | Single | ON, D, L, OFF |
| ㅙ | Single | ON, U, (Long) R, OFF |
| ㅞ | Single | ON, D, (Long) L, OFF |
| ㅚ | Single | ON, (Long) U, OFF |
| ㅟ | Single | ON, (Long) D, OFF |
| ㅢ | Single | (Long) ON, OFF |
| ㅣ | Single | ON, OFF |
| ㅡ | Multiple | ON, OFF |

In Table 2, a sliding direction "R" represents a rightward sliding direction, i.e. from a 9 o'clock direction to a 3 o'clock direction, and "L" represents a leftward sliding direction, i.e. from a 3 o'clock direction to a 9 o'clock direction. Further, "U" represents an upward sliding direction, i.e. from a 6 o'clock direction to a 12 o'clock direction, and "D" represents a downward sliding direction, i.e. from a 12 o'clock direction to a 6 o'clock direction.

FIGS. 8*a* to 8*e* illustrate a Korean input method in accordance with an illustrative embodiment.

In FIGS. 8*a* to 8*e*, a method of inputting a Korean word "평화" is illustrated. With touches as displayed on the touch zone 103, "ㅍ", "ㅕ", "ㅇ", "ㅎ", and "ㅘ" are selected in sequence to form the word "평화".

Figure 9A:
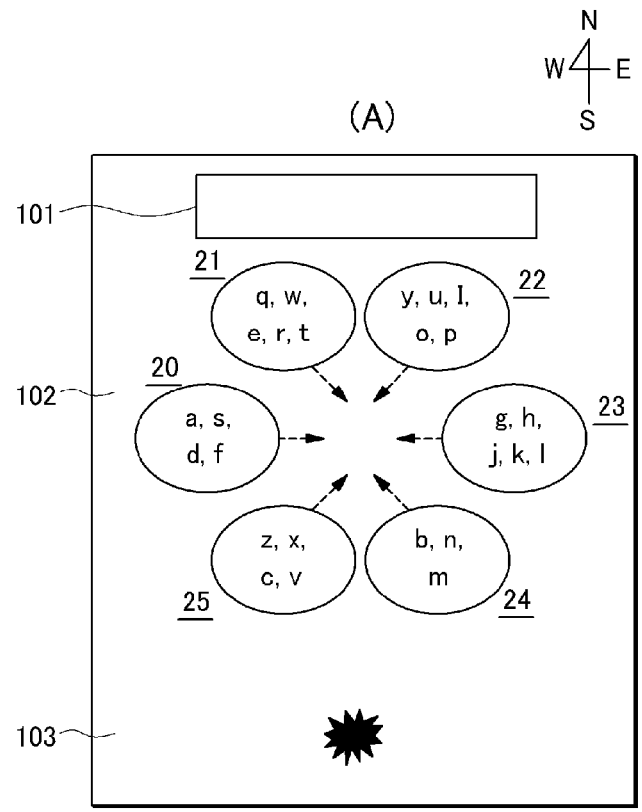
FIGS. 9A to 9C illustrate an alphabetic character input method in accordance with an illustrative embodiment.
Figure 9A:
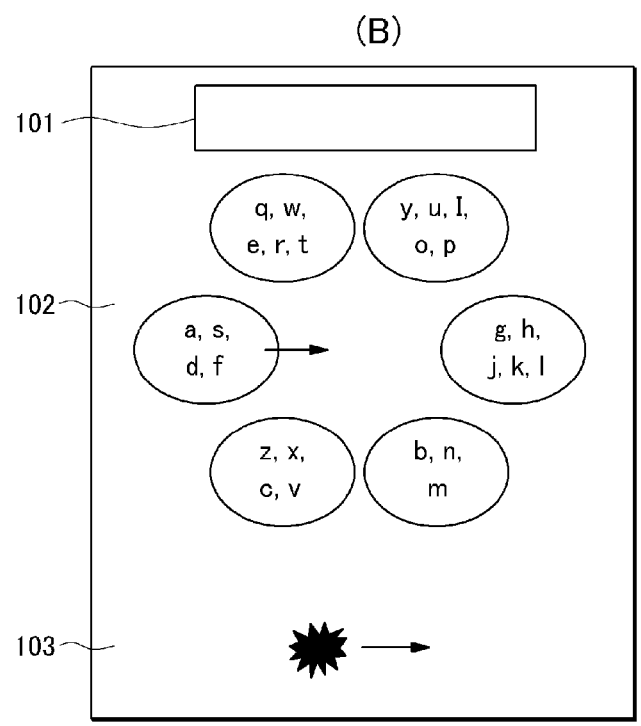
Figure 9B:
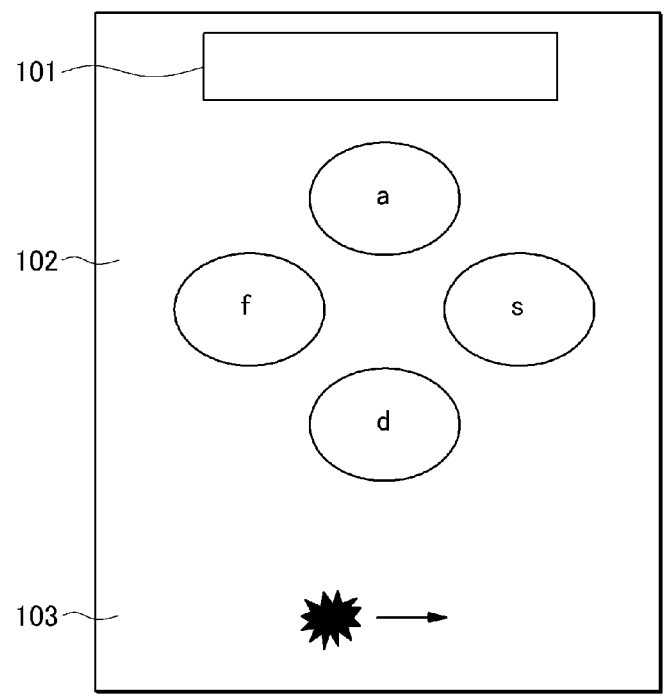
Figure 9B:
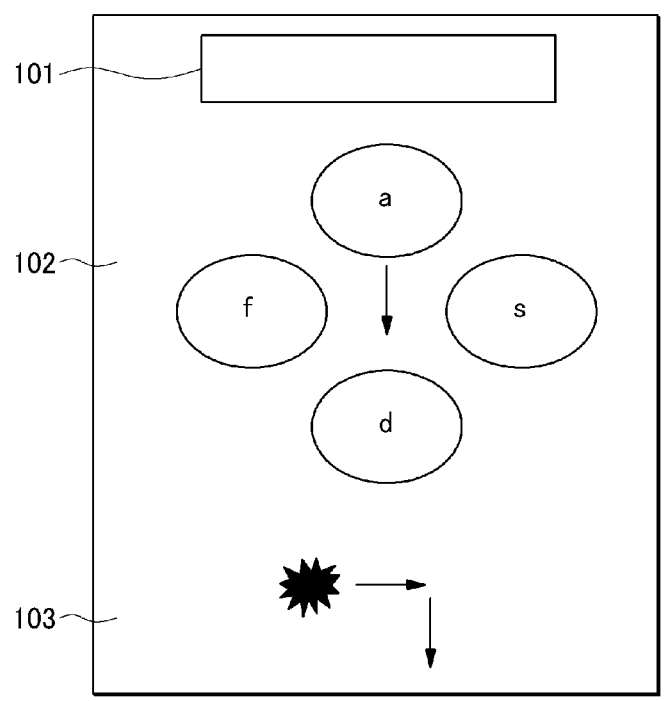
Figure 9C:
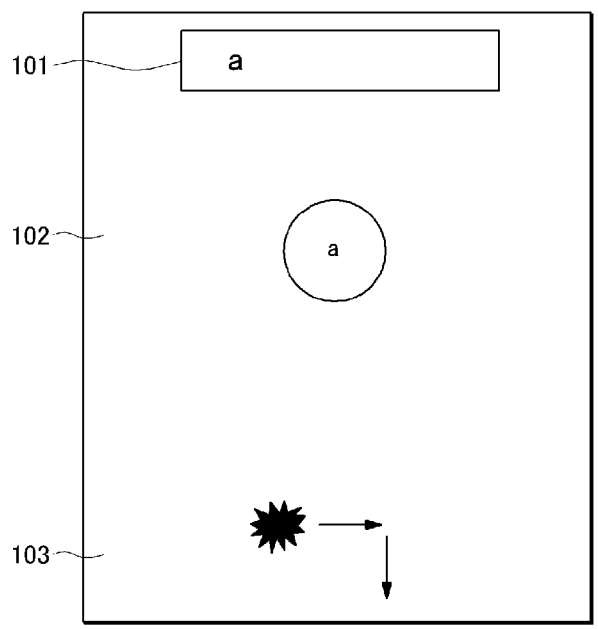

FIGS. 9*a* to 9*c* illustrate an alphabetic character input method in accordance with an illustrative embodiment.

As depicted in FIG. 9*a*(A), multiple alphabetic characters (a to z) are divided into character groups and displayed on the graphic zone 102 for displaying input characters. In this case, the respective character groups may be displayed on the graphic zone 102 so as to surround the central area of the graphic zone 102.

By way of example, there will be explained a method of inputting an alphabetic character "a" belonging to a character group 1 when the alphabetic characters are displayed as being grouped.

As depicted in FIG. 9*a*(A), the user makes a single touch on the touch zone 103, and as depicted in FIG. 9*a*(B), the user slides an input mean touching the touch zone 103 from a 9 o'clock direction to a 3 o'clock direction in order to arrange a character group 20 including "a" at the central area of the graphic zone 102.

When the character group 20 including "a" is arranged at the central area of the graphic zone 102, as depicted in FIG. 9*b*(C), characters belonging to the character group 20 including "a" are distributed and displayed at respectively preset positions. In this case, the characters belonging to the character group 20 may be displayed on the graphic zone 102 so as to surround the central area of the graphic zone 102.

Then, as depicted in FIG. 9b(D), the user slides the input mean touching the touch zone 103 from a 12 o'clock direction to a 6 o'clock direction, so that the alphabetic character "a" arranged at an upper end is moved to the central area of the graphic zone 102. After "a" is arranged at the central area of the graphic zone 102, if the user detaches his/her finger from the touch zone 103, the character "a" is displayed on the display zone 101 as depicted in FIG. 9c(E).

In this case, "a" may be arranged at a preset position on the graphic zone 102 by an operation of selecting the alphabetic character "a" from the touch zone 103 or a character displayed at a preset position on the graphic zone 102 may be input as a character selected by the user.

As described above, alphabetic characters can be divided into character groups 20 to 25 in various ways depending on, for example, an English keyboard layout, an alphabet layout order, pronunciation of an alphabetic character, and other preset rules. By way of example, as for the character groups 20 to 25 shown in FIG. 9a, a certain number of alphabetic characters are divided into the character groups 20 to 25 based on the English keyboard layout and arranged at respectively preset positions. The above-described alphabetic character input method follows the rules listed in Table 3.

TABLE 3

| Input character | Sliding direction | Number of touch |
| --- | --- | --- |
| a | ON, R, D, OFF | Single |
| b | ON, WN, D, OFF | Single |
| c | ON, EN, U, OFF | Single |
| d | ON, R, U, OFF | Single |
| e | ON, ES, U, OFF | Single |
| f | ON, R, R, OFF | Single |
| g | ON, L, D, OFF | Single |
| h | ON, L, L, OFF | Single |
| i | ON, WS, (Long) R, OFF | Single |
| j | ON, L, U, OFF | Single |
| k | ON, L, R, OFF | Single |
| l | ON, L, (Long) R, OFF | Single |
| m | ON, WN, R, OFF | Single |
| n | ON, WN, L, OFF | Single |
| o | ON, WS, U, OFF | Single |
| p | ON, WS, R, OFF | Single |
| q | ON, ES, D, OFF | Single |
| r | ON, ES, R, OFF | Single |
| s | ON, R, L, OFF | Single |
| t | ON, ES, (Long) R, OFF | Single |
| u | ON, WS, L, OFF | Single |
| v | ON, EN, R, OFF | Single |
| w | ON, ES, L, OFF | Single |
| x | ON, EN, L, OFF | Single |
| y | ON, WS, D, OFF | Single |
| z | ON, EN, D, OFF | Single |
| Space | (Long) ON, OFF | Single |
| Back-space | ON, OFF | Single |

In Table 3, touching the touch zone 103 with a finger, detaching the finger from the touch zone 103, a leftward sliding direction, a rightward sliding direction, an upward sliding direction, a downward sliding direction, left to right-downward/right to left-downward diagonal directions, and left to right-upward/right to left-upward diagonal directions are informally denoted as "ON", "OFF", "L", "R", "U", "D", "ES" or "WS", and "EN" or "WN", respectively. Herein, the number of touches is set to a single touch.

Figure 10:
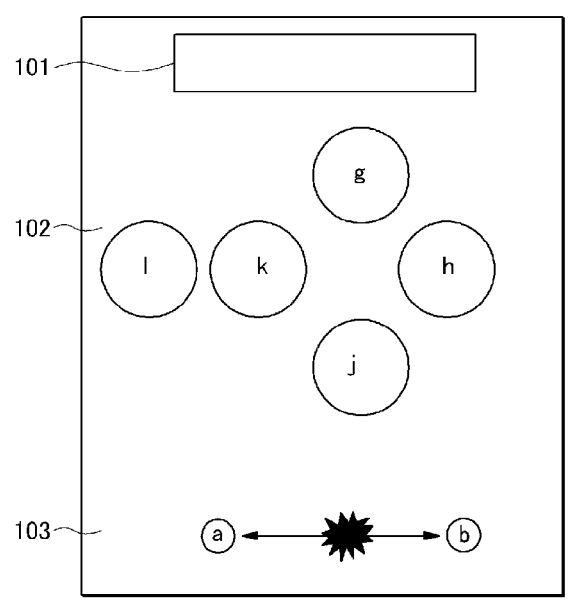
FIG. 10 illustrates an alphabetic character input method in accordance with an illustrative embodiment.

In Table 3, if the user touches the touch zone 103 with his/her finger and leftwardly slides the finger ⓐ, as depicted in FIG. 10, characters belonging to the character group 23 are arranged at respectively preset positions.

Herein, if there are five characters belonging to the character group 23, four of the characters are arranged at cardinal points north, south, east and west, respectively and the other one is arranged at the central area of the graphic zone 102 by making a long sliding of an input mean touching the touch zone 103 so as to be adjacent to one of the four characters.

That is, an alphabetic character "l" may be arranged on the left of "k" so as to be adjacent to each other according to a preset value. Therefore, in order to move "l" to the central area of the graphic zone 102, the user makes a rightward sliding ⓑ longer as compared with "k". Herein, a long rightward sliding operation may be substituted by a double-consecutive rightward sliding operation.

If the alphabetic character "l" is arranged in the WN direction according to a preset value, the user may touch the touch zone 103 with an input mean and slides the input mean in the right-downward diagonal (ES) direction to move "l" to the central area of the graphic zone 102. In addition to this method, various character input methods can be performed depending on a position of an alphabetic character.

Further, as depicted in FIG. 9a, in order to input at least one of characters belonging to the character group 25 arranged in the WS direction, the character group 25 is moved to the central area of the graphic zone 102 by sliding an input mean in the right-upward diagonal (EN) direction and then a character belonging to the character group 25 can be input according to the above-described input method.

A space can be input by making a long touch on the touch zone 103 for a critical time and detaching an input mean. Further, a back-space can be input by making a touch on the touch zone 103 and immediately detaching an input mean. The space can be input by making a touch (ON) on the touch zone 103, rightwardly sliding (R) an input mean, and detaching (OFF) the input mean from the touch zone 103. The back-space can be input by making a touch (ON) on the touch zone 103, leftwardly sliding (L) an input mean, and detaching (OFF) the input mean from the touch zone 103.

Figure 11:
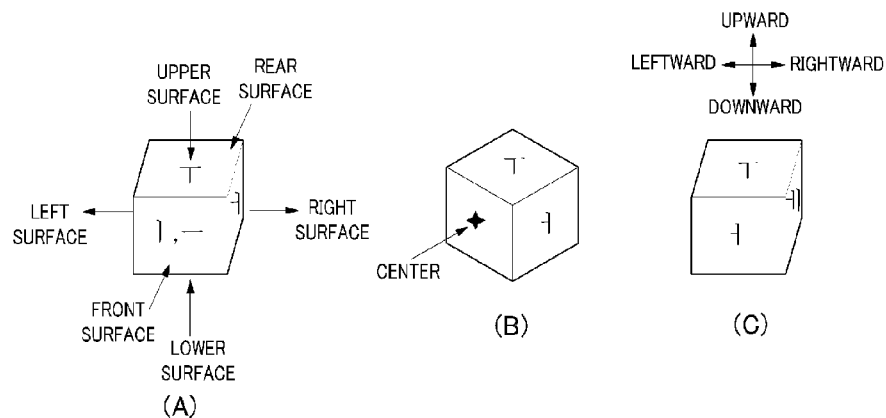
FIG. 11 is provided to explain a character input method in accordance with another illustrative embodiment.

FIG. 11 is provided to explain a character input method in accordance with another illustrative embodiment.

In the present illustrative embodiment, a virtual polyhedron is used to display a character group or a character. That is, a virtual polyhedron displaying a character or a character group is displayed on the graphic zone 102 by the display control unit 120. There has been used the same algorithm for setting a specific character as an input character depending on a touch type of a user as explained above.

As depicted in FIG. 11, for example, a base vowel "-" or "|" is displayed on a front surface of the polyhedron and vowels having one or more strokes added to the base vowel are displayed on other surfaces.

In this case, a vowel input process may be started from the vowel displayed on the front surface of the polyhedron, and if the vowel input process is ended, the polyhedron may be returned to its regular position as an initial state. Herein, the front surface of the polyhedron may be defined as a surface facing a front surface of the screen.

Referring to FIG. 11(A), if the user touches the touch zone 103 with an input mean one time, at least one of vowels "ㅏ", "ㅓ", "ㅐ", and "ㅔ" having one or more strokes added to the vowel "|" may be arranged on a side surface of the polyhedron and at least one of vowels "ㅗ", "ㅜ", "ㅛ", and "ㅠ" having one or more strokes added to the vowel "-" may be arranged on vertical (or upper and lower) surfaces.

In the present illustrative embodiment, the vowels "ㅏ", "ㅓ", "ㅐ", and "ㅔ" are arranged on the side surface and "ㅐ"

and "ㅖ" are arranged on a rear surface and "ㅐ" or "ㅔ" may be displayed in front depending on a leftward or rightward sliding direction. The vowels "ㅗ" and "ㅜ" are arranged on the upper surface and the lower surface, respectively.

If the user makes a single touch on the touch zone 103 and slides his/her finger in a leftward direction, the polyhedron is rotated as depicted in FIG. 11(B) and the vowel "ㅓ" is positioned in front. If the vowel "ㅓ" is positioned in front as depicted in FIG. 11(C), the vowel "ㅓ" is input.

Figure 12:
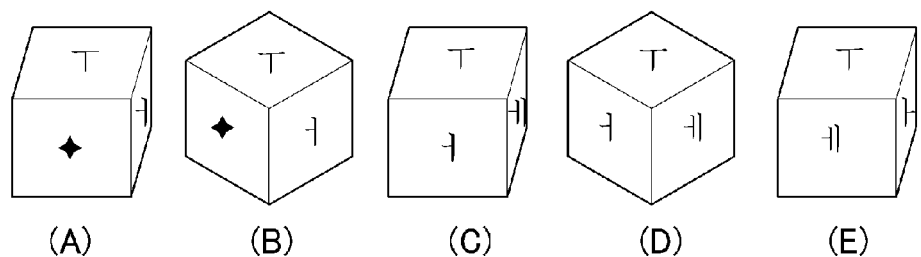
FIG. 12 is provided to explain a character input method in accordance with another illustrative embodiment.

FIG. 12 is provided to explain a character input method in accordance with another illustrative embodiment.

If the user makes a single touch on the touch zone 103 and continuously slides his/her finger in a leftward direction in order to input the vowel "ㅔ", a polyhedron is rotated in the leftward direction in sequence as depicted in FIGS. 12(A) to 12(D) and the vowel "ㅔ" is positioned in front. Then, as depicted in FIG. 12(E), when the vowel "ㅔ" is positioned in front, the vowel "ㅔ" is input.

The vowels "ㅏ" and "ㅐ" can be input in a similar way. That is, if the user makes a single touch on the touch zone 103 and slides his/her finger in a rightward direction, the polyhedron is rotated and the vowel "ㅏ" is positioned in front and the vowel "ㅏ" is input. If makes a single touch on the touch zone 103 and continuously slides his/her finger in a rightward direction in order to input the vowel "ㅐ", the polyhedron is rotated in the rightward direction and the vowel "ㅐ" is gradually moved to the front and the vowel "ㅐ" is input.

Figure 13:
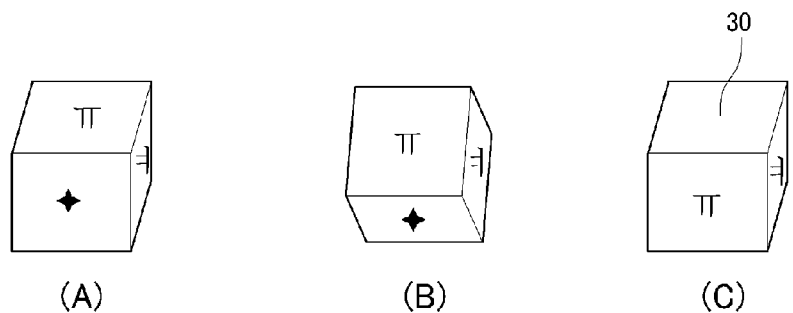
FIG. 13 illustrates an example of inputting a diphthong by multiple touches in accordance with another illustrative embodiment.

FIG. 13 illustrates an example of inputting a diphthong by multiple touches in accordance with another illustrative embodiment.

As depicted in FIG. 13(A), if the user touches the touch zone 103 twice or touches different two positions on the touch zone 103 at once, at least one of diphthongs "ㅑ", "ㅕ", "ㅒ", and "ㅖ" having one or more strokes added to the vowel "ㅣ" may be arranged on a side surface and at least one of diphthongs "ㅛ", "ㅠ", "ㅘ", "ㅝ", "ㅙ", "ㅞ" and "ㅢ" having one or more strokes added to the vowel "-" may be arranged on upper and lower surfaces.

In the present illustrative embodiment, the diphthongs "ㅑ", "ㅕ", "ㅒ", and "ㅖ" are arranged on the side surface and "ㅒ" and "ㅖ" are arranged on a rear surface and "ㅒ" or "ㅖ" may be displayed in front depending on a leftward or rightward sliding direction. The diphthongs "ㅛ" and "ㅠ" are arranged on the upper surface and the lower surface, respectively.

By way of example, if the user touches the touch zone 103 twice and slides his/her finger in a downward direction, the polyhedron is rotated in the downward direction as depicted in FIG. 13(B) and the diphthong "ㅠ" is positioned in front. If the diphthong "ㅠ" is positioned in front as depicted in FIG. 13(C), the diphthong "ㅠ" is input.

In this case, any one of "ㅘ", "ㅝ", "ㅙ", "ㅞ" and "ㅢ" may be displayed on an upper surface 30 according to a preset value. The diphthongs "ㅘ", "ㅝ", "ㅙ", "ㅞ" and "ㅢ" may be input in a method to be explained with reference to FIG. 14.

Figure 14:
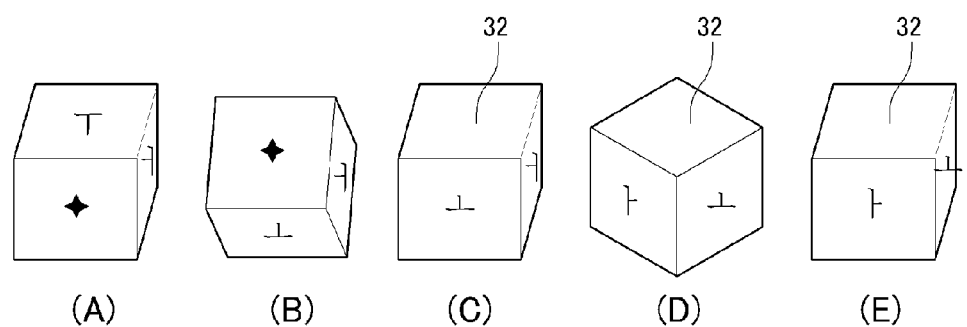
FIG. 14 illustrates an example of inputting diphthongs including vowels and combinations thereof in accordance with another illustrative embodiment.

FIG. 14 illustrates an example of inputting diphthongs including vowels and combinations thereof in accordance with another illustrative embodiment.

As for the diphthongs "ㅘ", "ㅝ", "ㅙ", "ㅞ" and "ㅢ", for example, "ㅘ" is a combination of monophthongs "ㅗ" and "ㅏ" and "ㅞ" is a combination of monophthongs "ㅜ" and "ㅖ". The diphthongs "ㅘ", "ㅝ", "ㅙ", "ㅞ" and "ㅢ" can be input by using such combination of monophthongs.

By way of example, the user makes a single touch on the touch zone 103 with a finger in FIG. 14(A) and slides the finger, and as depicted in FIGS. 14(B) and 14(C), a polyhedron is rotated in an upward direction until the vowel "ㅗ" is positioned in front.

Then, the user slides the finger in a rightward direction, and as depicted in FIGS. 14 (D) and 14(E), the polyhedron is rotated until the vowel "ㅏ" is positioned in front. If so, the vowel "ㅘ" as a combination of the vowels "ㅗ" and "ㅏ" is input. In this case, the vowel "ㅘ" may be displayed on a front surface of the polyhedron and at least one of the "ㅙ" and "ㅝ" may be displayed on an upper surface 32.

Desirably, the above-described vowel input method can be shown in Table 4.

TABLE 4

| Vowel | Touch type | Sliding direction |
|---|---|---|
| ㅏ | Single | Rightward |
| ㅓ | Single | Leftward |
| ㅗ | Single | Upward |
| ㅜ | Single | Downward |
| ㅐ | Single | Rightward (Long sliding) |
| ㅔ | Single | Leftward (Long sliding) |
| ㅑ | Multiple | Rightward |
| ㅕ | Multiple | Leftward |
| ㅒ | Multiple | Rightward (Long sliding) |
| ㅖ | Multiple | Leftward (Long sliding) |
| ㅛ | Multiple | Upward |
| ㅠ | Multiple | Downward |
| ㅘ | Single | Upward + Rightward |
| ㅝ | Single | Downward + Leftward |
| ㅙ | Single | Upward + Rightward (Long sliding) |
| ㅞ | Single | Downward + Leftward (Long sliding) |
| ㅚ | Single | Upward + Single touch |
| ㅟ | Single | Downward + Single touch |
| ㅢ | Multiple + Single | None |
| ㅣ | Single | First single touch |
| ㅡ | Multiple | None |

To be specific, in Table 4, when the vowel "ㅘ" is input, "Upward+Rightward" means a combination of an upward sliding of the polyhedron and a rightward sliding of the polyhedron. Further, it can be seen that in order to input the vowel "ㅚ", the user makes a single touch and slides his/her finger in an upward direction until the vowel "ㅗ" is positioned in front and then makes a single touch on the touch zone 103 with his/her finger.

Further, in order to input the vowel "ㅢ", the user touches the touch zone 103 of the polyhedron multiple times and continuously makes a single touch without a sliding operation, so that the vowel "ㅢ" can be automatically input. To be specific, if the user touches touch zone 103 twice or touches different two positions on the touch zone 103 at once and continuously makes a single touch on the touch zone 103, the vowel "ㅢ" can be input.

It can be seen that as for the vowel "ㅣ", if the user makes a single touch on the touch zone 103, when the user detaches his/her finger from the screen or a critical time elapses, the vowel "ㅣ" is input.

Further, it can be seen that as for the vowel "-", if the user touches the touch zone 103 multiple times without a sliding operation, when the user detaches his/her finger from the screen or a critical time elapses, the vowel "-" is automatically input.

Otherwise, if the user makes a single touch on the touch zone 103 with a finger and a critical time elapses, the vowel "-" can be input. If the user makes a single touch on the touch zone 103 with a finger and a critical time elapses, the vowel "|" can be input.

The vowel input method shown in Table 4 is an example and can be implemented in various ways depending on a position of a vowel on a polyhedron, a kind of a polyhedron, a preset value, and an algorithm.

Figure 15:
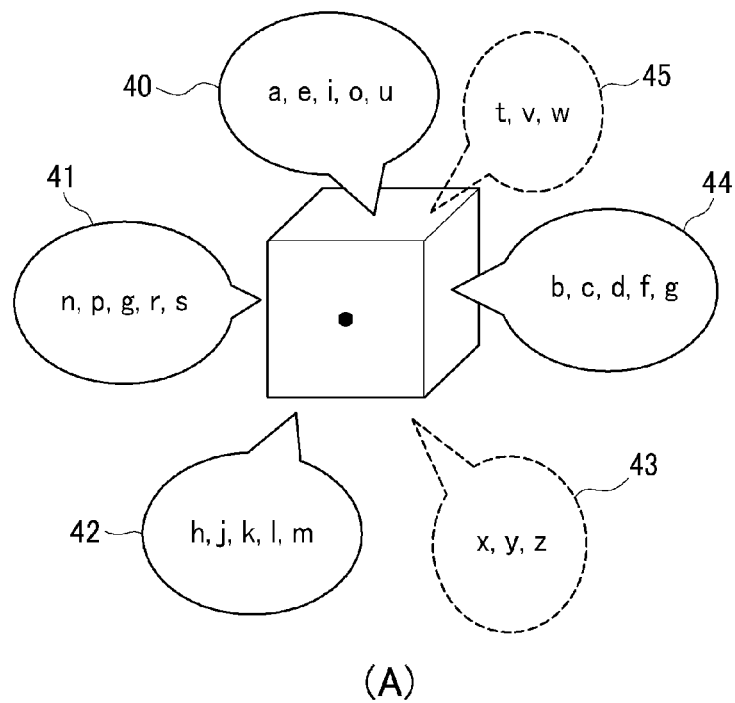
FIGS. 15 and 16 illustrate a method of inputting alphabetic characters with a polyhedron in accordance with another illustrative embodiment.
Figure 15:
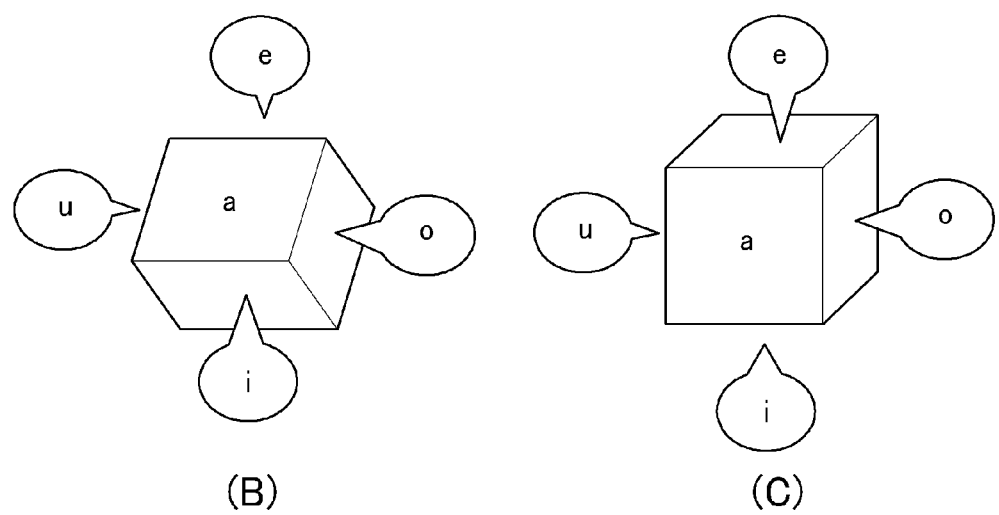
Figure 16:
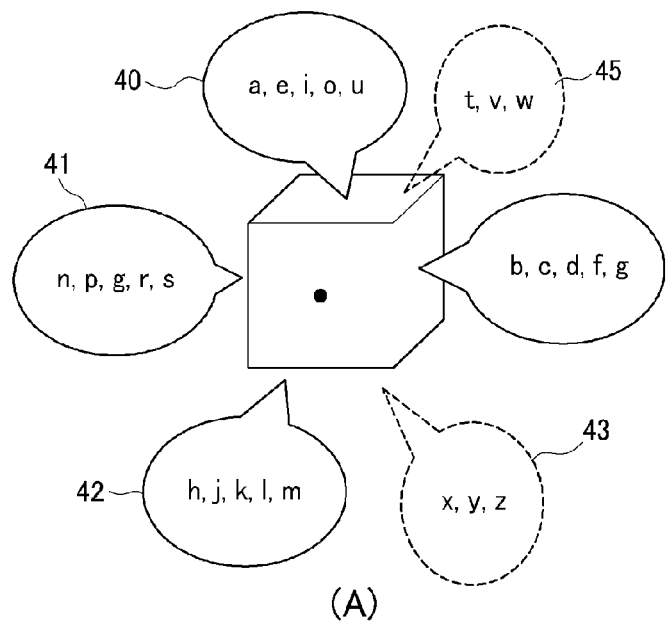
Figure 16:
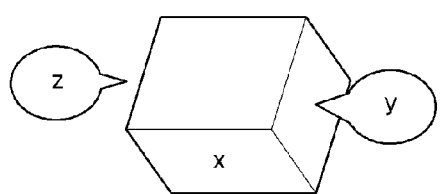
Figure 16:
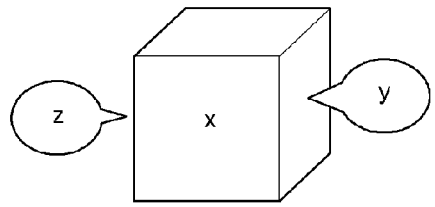
Figure 16:
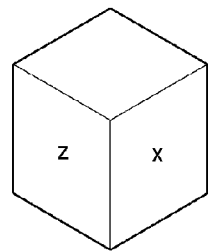
Figure 16:
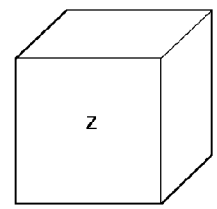

FIGS. 15 and 16 illustrate a method of inputting alphabetic characters with a polyhedron in accordance with another illustrative embodiment.

In accordance with an illustrative embodiment, if a character is input by a single touch, a character displayed on a front surface of a polyhedron can be input by a touch-on operation in which a finger touches a screen (the front surface of the polyhedron or a screen displaying the polyhedron) and a touch-off operation in which the finger is detached from the screen. A character displayed on a right surface of the polyhedron is input by a touch-on operation, a leftward sliding, and a touch-off operation. Further, a character displayed on an upper surface is input by a touch-on operation, a downward sliding, and a touch-off operation. That is, characters displayed on the respective surfaces can be selected depending on a rotation direction of the virtual polyhedron.

Herein, the single touch may include touching the front surface of the polyhedron or the screen displaying the polyhedron with a finger one time as described above. After the user slides his/her finger one time in any one direction of the polyhedron, the user can continuously slides the polyhedron in any one of the four directions. Accordingly, the number of characters which can be input to the polyhedron is shown in Table 5.

TABLE 5

| Character input method | Number of characters which can be input |
| --- | --- |
| Touch-on, No sliding, Touch-off | 1 |
| Touch-on, Sliding once, Touch-off | 4 |
| Touch-on, Sliding twice, Touch-off | 4*4 |
| ouch-on, Sliding three times, Touch-off | 4*4*4 |

Meanwhile, a character is input by multiple touches, the number of characters which can be input is the same as listed in Table 5. Herein, the multiple touches may include touching the front surface of the polyhedron or the screen displaying the polyhedron twice or touching different two positions on the front surface of the polyhedron or the screen displaying the polyhedron at once.

Therefore, for user convenience, the number of slidinings is limited to two. If multiple touches are allowed, the total number of characters which can be input is 42 (=(1+4+4*4)*2). That is, it can be seen that all the alphabetic characters can be input with a single polyhedron. Herein, with a touch screen supporting multiple touches, a "touch-on, touch-off, touch-on" operation can be carried out by touching the touch screen with two fingers at once.

Table 6 shows a method of inputting alphabetic characters with a polyhedron. Herein, touching a screen with a finger, detaching the finger from the screen, a leftward sliding based on a front side of the polyhedron, a rightward sliding, an upward sliding, and a downward sliding are informally denoted as "ON", "OFF", "L", "R", "U", and "D", respectively. In Table 6, a single touch is made and "ON, OFF, ON" can be substituted by "TWO-FINGERS ON" for touching the screen with two fingers at once.

TABLE 6

| Input character | Touch type |
| --- | --- |
| a | ON, D, OFF |
| b | ON, L, OFF |
| c | ON, L, D, OFF |
| d | ON, L, U, OFF |
| e | ON, D, D, OFF |
| f | ON, L, L, OFF |
| g | ON, L, R, OFF |
| h | ON, U, OFF |
| i | ON, D, U, OFF |
| j | ON, U, D, OFF |
| k | ON, U, U, OFF |
| l | ON, U, L, OFF |
| m | ON, U, R, OFF |
| n | ON, R, OFF |
| o | ON, D, L, OFF |
| p | ON, R, D, OFF |
| q | ON, R, U, OFF |
| r | ON, R, L, OFF |
| s | ON, R, R, OFF |
| t | ON, OFF, ON, D, OFF |
| u | ON, D, R, OFF |
| v | ON, OFF, ON, D, L, OFF |
| w | ON, OFF, ON, D, R, OFF |
| x | ON, OFF, ON, U, OFF |
| y | ON, OFF, ON, U, L, OFF |
| z | ON, OFF, ON, U, R, OFF |
| Space | ON, OFF |
| Back-space | ON, OFF, ON, L, OFF |

In Table 6, each alphabetic character belongs to one of character groups 40 to 45. By way of example, a first character group 40 includes "a", "e", "i", "o", and "u", a second character group 41 includes "n", "p", "g", "r", and "s", a third character group 42 includes "h", "j", "k", "l", and "m", a fourth character group 43 includes "x", "y", and "z", a fifth character group 44 includes "b", "c", "d", "f", and "g", and a sixth character group 45 includes "t", "v", and "w".

In Table 6, the characters belonging to the fourth character group 43 and the sixth character group 45 can be selected by inputting multiple touches. Further, a space can be input by "touch-on, touch-off" and a back-space can be input by "touch-on, touch-off, touch-on, leftward sliding, touch-off".

By way of example, if an input character "a", the user touches the screen with a finger and makes a downward sliding and then detaches his/her finger from the screen, so that "a" can be input. Hereinafter, a method of inputting alphabetic characters "a" and "z" will be explained with reference to FIGS. 15 and 16.

As depicted in FIG. 15(A), there are twenty six characters from "a" to "z" listed in Table 6. As for a polyhedron having six surfaces, four character groups each including five alphabetic characters and two character groups each including three alphabetic characters may be presented in speech bubbles and arranged on the respective surfaces of the polyhedron. Herein, a character can be included in a character group depending on its feature. By way of example, "a", "e", "i", "o", and "u" as vowels can be grouped into the first character group 40 and displayed on an upper surface of the polyhedron.

Herein, a speech bubble of an alphabetic character group input by multiple touches may be formed differently from a speech bubble of an alphabetic character group input by a single touch. A color and thickness of a character belonging to a character group may be different from each other in order for a user to easily distinguish a character input by a single touch from a character input by multiple touches. By way of example, as for the fourth and sixth character groups 43 and 45 including alphabetic characters input by multiple touches, a speech bubble is shown in a dotted line so as to be distinguished from the other character groups including alphabetic characters input by a single touch.

As depicted in FIGS. 15(B) and 15(C), in order to input "a" belonging to the first character group 40, if the user touches the front surface of the polyhedron or the screen displaying the polyhedron and slides his/her finger in a downward direction of the polyhedron displaying the character group including "a", the polyhedron is rotated in the sliding direction and each character of the character group including "a" is distributed to each surface of the polyhedron based on a preset value.

By way of example, each of the alphabetic characters "a", "e", "i", "o", and "u" belonging to the first character group 40 is positioned on each of right and left surfaces, upper and lower surfaces, and a front surface of the polyhedron. Herein, "a" as a foremost character among the character group may be distributed to the front surface of the polyhedron and may be input (see a method of inputting "a" shown in Table 6).

Herein, each character belonging to a character group may be displayed directly on a surface of a polyhedron or a speech bubble including the character may be displayed on each surface of the polyhedron. A size of a speech bubble can be adjusted depending on the number of characters belonging to the speech bubble. A speech bubble positioned in front may be removed.

The alphabetic character "u" can be input by touch-on, downward sliding, rightward sliding, and touch-off in FIG. 15(A). That is, when "a" is positioned in front, "u" can be input by continuous rightward sliding operations.

After touch-off or if there is no touch for a certain time, the polyhedron can be returned to its regular position as an initial state.

As depicted in FIGS. 16(A) to 16(E), "z" belonging to the fourth character group 43 can be input by multiple touches ("ON, OFF, ON"), upward sliding, rightward sliding, and touch-off.

Herein, referring to a method of inputting "z" shown in Table 6, the multiple touches including "ON, OFF, ON" can be implemented by "touching on, touching off, and touching on" the screen with a finger or touching the screen with two fingers at once.

In addition to the above-described alphabetic characters, Korean consonants can be input with a three-dimensional polyhedron.

Figure 17:
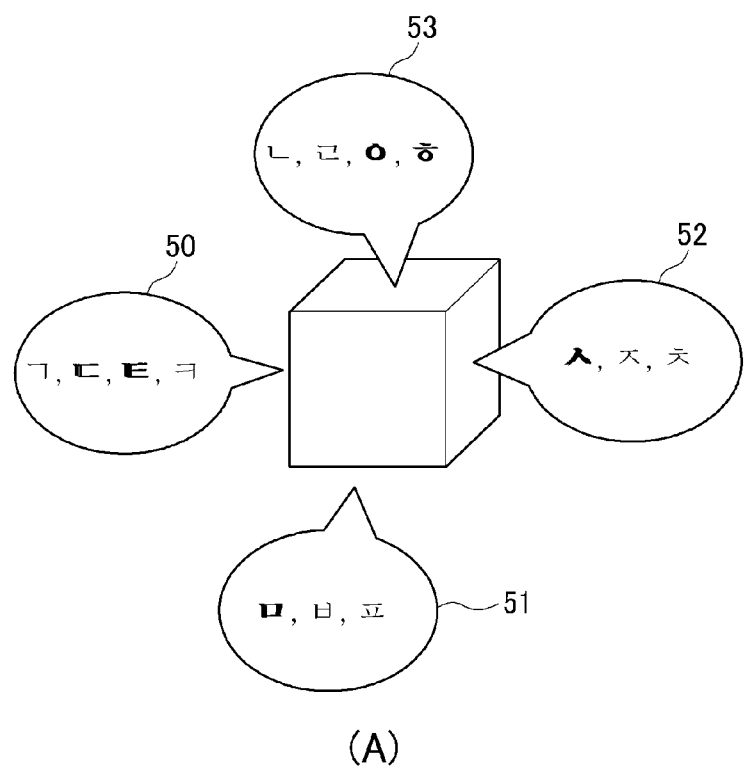
FIG. 17 illustrates a method of inputting Korean consonants with a polyhedron in accordance with another illustrative embodiment.
Figure 17:
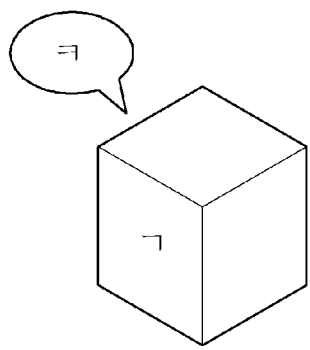
Figure 17:
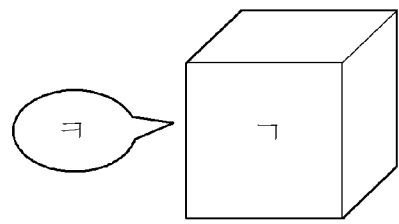

FIG. 17 illustrates a method of inputting Korean consonants with a polyhedron in accordance with another illustrative embodiment.

As depicted in FIG. 17(A), the Korean consonants are made up of 14 basic consonants from "ㄱ" to "ㅍ", and three or four consonants are grouped into four character groups and can be arranged on each surface of a polyhedron. The consonants can be grouped according to their features (for example, places of articulation, whether a consonant is voiced or voiceless, strength of sound, and manners of articulation).

Table 7 shows a Korean consonant input method as below.

TABLE 7

| Input character | Touch type |
| --- | --- |
| ㄱ | ON, R, OFF |
| ㄴ | ON, D, OFF |
| ㄷ | ON, OFF, ON, R, OFF |
| ㄹ | ON, D, D, OFF |
| ㅁ | ON, OFF, ON, U, OFF |
| ㅂ | ON, U, OFF |
| ㅅ | ON, OFF, ON, L, OFF |
| ㅇ | ON, OFF, ON, D, OFF |
| ㅈ | ON, L, OFF |
| ㅊ | ON, L, L, OFF |
| ㅌ | ON, OFF, ON, R, R, OFF |
| ㅍ | ON, U, U, OFF |
| ㅋ | ON, R, R, OFF |
| ㅎ | ON, OFF, ON, D, D, OFF |
| Space | ON, OFF |

In Table 7, each basic consonant is included in one of character groups 50 to 53. By way of example, a first character group 50 includes "ㄱ", "ㄷ", "ㅌ", and "ㅋ", a second character group 51 includes "ㅁ", "ㅂ", and "ㅍ", a third character group 52 includes "ㅅ", "ㅈ", and "ㅊ", and a fourth character group 53 includes "ㄴ", "ㄹ", "ㅇ", and "ㅎ". The consonants can be grouped according to their features (for example, places of articulation, whether a consonant is voiced or voiceless, strength of sound, and manners of articulation) or other preset rules. A space can be input by touching a screen with a finger and detaching the finger from the screen.

Typically, a user holds an input mean such as a smart phone and inputs characters with both thumbs. Therefore, when a polyhedron displaying character groups each including consonants listed in Table 7 and a polyhedron displaying character groups each including vowels are arranged on a screen, Korean words can be input by controlling the polyhedron for inputting consonants with a left thumb and the polyhedron for inputting vowels with a right thumb.

Herein, the polyhedron displaying consonant groups is arranged on the left and a user inputs consonants with his/her left thumb.

By way of example, in order to input "ㄱ", the user touches the screen, slides his/her left thumb in a rightward direction, and detaches his/her left thumb from the screen.

Further, input of "ㄷ", "ㅌ", "ㅇ", "ㅎ", "ㅈ", and "ㅁ" listed in Table 7 is started by multiple touches including "ON, OFF, ON". To be specific, "ON, OFF, ON" can be implemented by "touching on, touching off, and touching on" the screen with a finger. Herein, it can be recognized that "touching on, touching off, and touching on" the screen with a finger is the same as touching the screen with two fingers at once.

Hereinafter, there will be explained a method of inputting "ㄱ" and "ㅂ" of Korean consonants.

As depicted in FIG. 17(A), the Korean consonants are made up of 14 basic consonants from "ㄱ" to "ㅍ", and four character groups each including three or four consonants can be arranged on each surface of a polyhedron.

As depicted in FIGS. 17(A) to 17(C), the consonant "ㄱ" belonging to the first character group 50 can be input by making a single touch on the screen, sliding a finger in a rightward direction, and detaching the finger from the screen. Herein, "ㅌ" and "ㄷ" belonging to the same character group 50 may not be displayed on the screen after the single touch is made.

Figure 18:
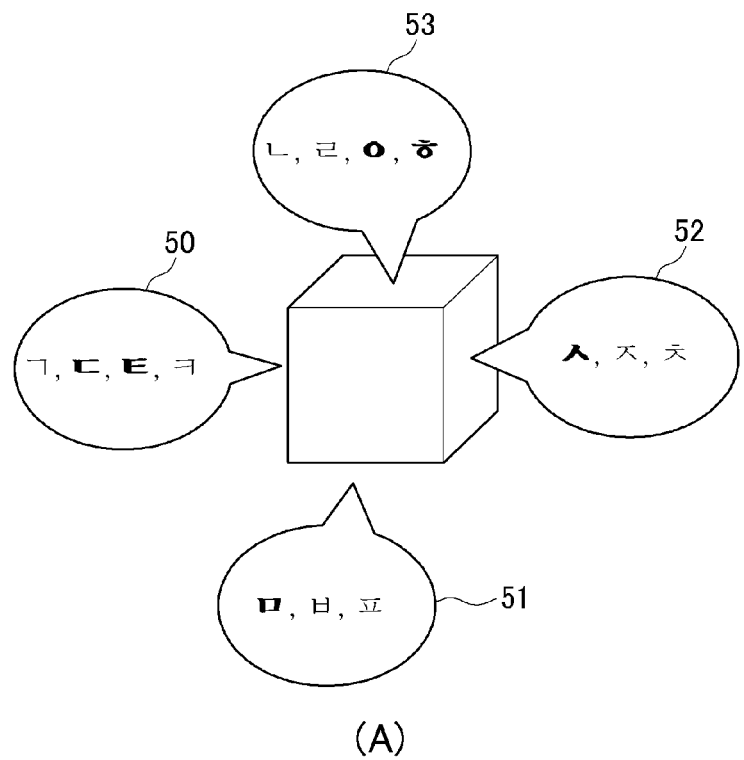
FIG. 18 illustrates a method of inputting Korean consonants with a polyhedron in accordance with another illustrative embodiment.
Figure 18:
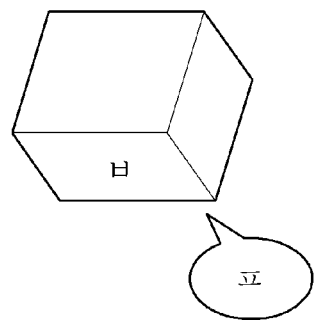
Figure 18:
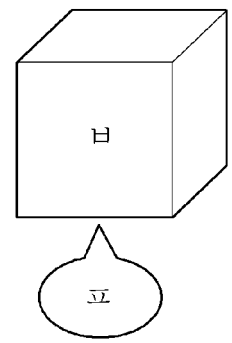

Further, as depicted in FIGS. 18(A) to 18(C), the consonant "ㅂ" belonging to the second character group 51 can be input by making a single touch on the screen, sliding a finger in an upward direction, and detaching the finger from the screen. Herein, "ㅁ" belonging to the second character group 51 may not be displayed on the screen after the single touch is made.

Figure 19:
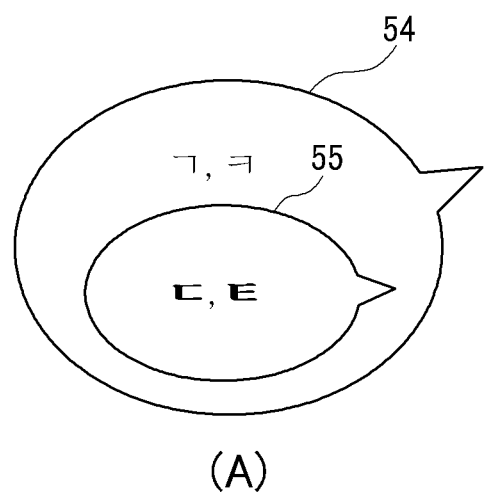
FIG. 19 illustrates a method of identifying a character input by a single touch or multiple touches in accordance with an illustrative embodiment.
Figure 19:
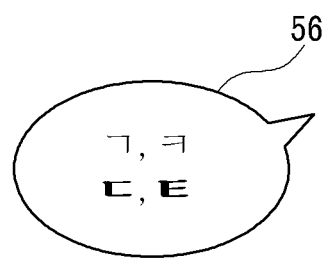

FIG. 19 illustrates a method of identifying a character input by a single touch or multiple touches in accordance with an illustrative embodiment.

Herein, consonants input by multiple touches may be different from other consonants in color, size, and thickness of a character as depicted in FIGS. 19(A) and 19(B) or may be grouped into a character subgroup 55 in order for a user to distinguish them. Otherwise, a speech bubble including a character group may be formed variously or a color and thickness of a character may be expressed in various ways in order for the user to easily distinguish a character input by a single touch from a character input by multiple touches.

The above-described screen may be a screen displaying a polyhedron or a touch zone corresponding to the screen displaying a polyhedron and installed in an apparatus.

The above-described character input method is an example and can be implemented in various ways depending on a position of a character arranged on a polyhedron or a position of a character group including characters, a kind of a polyhedron, a preset value, and an algorithm.

The above-described polyhedron may be a transparent three-dimensional structure allowing all characters or character groups arranged on each surface thereof to be displayed. Otherwise, the polyhedron may include various there-dimensional characters divided in a virtual three-dimensional form and while these characters are rotated, alphabets arranged on each surface of these characters may be displayed on a screen.

Multiple polyhedrons may be displayed on the screen and provided to a user. By way of example, a polyhedron including a character group of single consonants, a polyhedron including a character group of double consonants, and a polyhedron including a character group of vowels and marks may be displayed on a screen together.

Characters arranged in the above-described polyhedron may be displayed on a certain zone of a character input screen in order for a user to see the characters at a time.

Further, the character input method using a polyhedron can be used for inputting double consonants. The double consonants may include "ㄲ", "ㄸ", "ㅆ", "ㅉ", "ㅃ", "ㄳ", "ㄵ", "ㄶ", "ㄺ", "ㄻ", "ㄼ", "ㄽ", "ㄾ", "ㄿ", "ㅀ", and "ㅄ". These double consonants may be grouped in an appropriate number, arranged on each surface of a polyhedron, and input by using the input methods shown in Tables 2 and 3.

To be specific, these double consonants may be divided into a first character group including "ㄲ", "ㄸ", "ㅆ", "ㅉ", and "ㅃ", a second character group including "ㄵ", "ㄶ", and "ㅄ", a third character group including "ㄺ", "ㄻ", "ㄼ", and "ㄽ", and a fourth character group including "ㄾ", "ㄿ", and "ㅀ" and arranged on each surface of a polyhedron. One or more double consonants belonging to each character group may be arranged on each surface of the polyhedron.

The character input method using a polyhedron can be used for inputting numbers and other marks. By way of example, the marks may include mathematical symbols and various special characters which can be grouped and arranged on a polyhedron as described above.

In order to convert the polyhedron displaying the single consonants into the polyhedron displaying the double consonants, a conversion menu and a conversion key may be used. Otherwise, input conversion of a single consonant into a double consonant may be carried out simply by a touch on a screen.

Korean characters can be input by directly touching a polyhedron. Further, with a terminal including a separate touch zone, Korean characters can be input by moving a virtual polyhedron depending on a touch point and a touch type at the touch zone.

As compared with a conventional method in which a character is input in a two-dimensional way, a character can be input by using three-dimensional visual effects, resulting in an increase in interest of emotional users. Further, a three-dimensional structure may provide the disabled or the old and the infirm and foreigners or children with much convenience in inputting characters, intimacy, and learning effects.

Conventionally, when a character is input with buttons on a touch screen, the character needs to be accurately input by a finger relatively bigger than the character on the touch screen. Therefore, an input speed is decreased and typographical errors are often made. In accordance with the illustrative embodiments of the present disclosure, a character can be input more easily by using a sliding direction and the number of slidings.

FIG. 20 is a flow chart that shows a character input method using a character input apparatus in accordance with an illustrative embodiment.

The display control unit 120 displays multiple character groups each including one or more characters on the graphic zone 102 (S2010). In this case, as depicted in FIG. 3, the display control unit 120 may distribute and display the multiple character groups around the graphic zone 102. Otherwise, as depicted in FIG. 11, the display control unit 120 may display a virtual polyhedron and distribute the multiple character groups to each surface of the polyhedron.

Then, the display control unit 120 selects any one of the multiple character groups depending on a touch type of the input mean sensed by the touch zone 103 (S2020). By way of example, if a user touches a first position of the touch zone 103 with an input mean and slides the input mean from the first position to a second position, a character group to be arranged at the central area of the graphic zone 102 when it slides in such a sliding direction is automatically selected.

Thereafter, the display control unit 120 distributes the characters included in the selected character group to predetermined positions of the graphic zone 102 and display them (S2030).

Subsequently, the display control unit 120 displays one character selected at the touch zone 103 from the distributed characters at a predetermined position of the graphic zone 102 (S2040). In the same manner as described in step S2020, a character is automatically selected depending on a sliding direction of the input mean and the selected character is displayed at the predetermined position.

Then, the input unit 130 inputs the character displayed at the predetermined position of the graphic zone 102 as a character input by the user (S2050).

For reference, each of components illustrated in FIG. 2 in accordance with the illustrative embodiment of the present disclosure may imply software or hardware such as a field programmable gate array (FPGA) or an application specific integrated circuit (ASIC), and they carry out a predetermined function.

However, the components are not limited to the software or the hardware, and each of the components may be stored in an addressable storage medium or may be configured to implement one or more processors.

Accordingly, the components may include, for example, software, object-oriented software, classes, tasks, processes, functions, attributes, procedures, sub-routines, segments of program codes, drivers, firmware, micro codes, circuits, data, database, data structures, tables, arrays, variables and the like.

The components and functions thereof can be combined with each other or can be divided.

The illustrative embodiments can be embodied in a storage medium including instruction codes executable by a computer or processor such as a program module executed by the computer or processor. A data structure in accordance with the illustrative embodiments can be stored in the storage medium executable by the computer or processor. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The system and method of the present disclosure has been explained in relation to a specific embodiment, but its components or a part or all of its operation can be embodied by using a computer system having general-purpose hardware architecture.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A character input apparatus comprising:
a display unit configured to display a graphic zone that displays multiple character groups including one or more characters and a touch zone that senses a touch of an input mean;
a display control unit configured to select any one of the multiple character groups depending on a touch type of the input mean sensed by the touch zone and display the selected character at a predetermined position of the graphic zone; and
an input unit configured to set the character displayed at the predetermined position of the graphic zone for a predetermined time as an input character,
wherein the graphic zone and the touch zone are defined in a touch screen of the character input apparatus, and
when the characters displayed on the graphic zone are moved in a sliding direction of the input mean by a touch input of the input mean on the touch screen, the display control unit selects a character moved to be closest to the predetermined position by the sliding direction and displays the selected character at the predetermined position of the graphic zone.

2. The character input apparatus of claim 1,
wherein the graphic zone is included in the touch zone, and
the display control unit selects a character or a character group displayed on the graphic zone depending on a touch type at the touch zone regardless of a direct or indirect touch of the input mean on the character or the character group.

3. The character input apparatus of claim 1,
wherein the display unit further comprises:
a display zone that displays the input character set by the input unit.

4. The character input apparatus of claim 1,
wherein the display control unit selects any one of the multiple character groups depending on a touch type of the input mean sensed by the touch zone and distributes and displays characters included in the selected character group on the graphic zone, and
the display control unit selects a character group moved to be closest to the predetermined position when the character groups displayed on the graphic zone are moved in a sliding direction of the input mean.

5. The character input apparatus of claim 1,
wherein when the input mean slides from a first position to a second position, the display control unit generates a vector that indicates a direction of the sliding, and when an ending point of the vector is mapped onto the predetermined position, the display control unit determines a character or a character group closest to a starting point of the vector or a character or a character group arranged in a direction indicated by the starting point of the vector as a character or a character group selected by a user.

6. The character input apparatus of claim 1,
wherein the display control unit converts a state of a character or a character group to be displayed on the graphic zone depending on the number of touches at the touch zone, and
the number of touches comprises a single touch that includes touching the touch zone one time and multiple touches that include touching the touch zone two or more times or touching the touch zone with two fingers at once.

7. The character input apparatus of claim 1,
wherein the display control unit displays, on the graphic zone, the character group or the character to surround a central area of the graphic zone.

8. The character input apparatus of claim 1,
wherein the character includes at least one of alphabetic characters, Korean consonants, Korean vowels, numbers, and marks.

9. The character input apparatus of claim 1,
wherein the display control unit displays a virtual polyhedron on the graphic zone and distributes and displays character groups or characters on each surface of the polyhedron.

10. The character input apparatus of claim 9,
wherein the display control unit selects a character or a character group moved to be closest to a position displayed on a front surface of the polyhedron when the character groups or characters displayed on the polyhedron are moved in the sliding direction of the input mean.

11. The character input apparatus of claim 9,
wherein the display control unit rotates the virtual polyhedron on any one of an X-axis, an Y-axis, and a Z-axis along the sliding direction of the input mean and displays, on a front surface of the display zone, characters assigned to a rotated surface in advance.

12. A character input method using a character input apparatus, the character input method comprising:
- (a) displaying multiple character groups including one or more characters on a graphic zone;
- (b) selecting any one of the multiple character groups depending on a touch type of an input mean sensed by a touch zone;
- (c) arranging the selected character group at a predetermined position of the graphic zone;
- (d) distributing and displaying characters included in the selected character group on the graphic zone;
- (e) selecting any one of the characters displayed on the graphic zone depending on the touch type of the input mean at the touch zone;
- (f) arranging the character selected in the step (e) at the predetermined position of the graphic zone; and
- (g) when the character arranged in the step (f) is displayed at the predetermined position of the graphic zone for a predetermined time, setting the character as an input character,
wherein in the steps (b) and (e), a character group or a character moved to be closest to the predetermined position when the character groups or characters displayed on the graphic zone are moved in a sliding direction of the input mean is selected.

13. The character input method of claim 12,
wherein the graphic zone is included in the touch zone, and in the steps (b) and (e), a character or character group displayed on the graphic zone is selected depending on a touch type at the touch zone regardless of a direct or indirect touch of the input mean on the character or the character group.

14. The character input method of claim 12, further comprising:
displaying the input character set in the step (g) on the graphic zone.

15. The character input method of claim 12,
wherein the steps (b) and (e) comprise:
when the input mean slides from a first position to a second position, generating a vector that indicates a direction of the sliding;
mapping an ending point of the vector onto the predetermined position; and
determining a character or a character group closest to a starting point of the vector after the mapping as a character or a character group selected by a user.

16. The character input method of claim 12,
wherein the steps (b) and (e) comprise:
when the input mean slides from a first position to a second position, generating a vector that indicates a direction of the sliding;
mapping an ending point of the vector onto the predetermined position; and
determining a character or a character group arranged in a direction indicated by a starting point of the vector after the mapping as a character or a character group selected by a user.

* * * * *